(12) United States Patent
Maeda

(10) Patent No.: US 6,768,831 B2
(45) Date of Patent: Jul. 27, 2004

(54) OPTICAL ADD-DROP MULTIPLEXING APPARATUS

(75) Inventor: Takuji Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 324 days.

(21) Appl. No.: 10/091,887

(22) Filed: Mar. 6, 2002

(65) Prior Publication Data

US 2003/0044109 A1 Mar. 6, 2003

(30) Foreign Application Priority Data

Aug. 30, 2001 (JP) ........................................ 2001-261977

(51) Int. Cl.[7] ............................................... G02B 6/28
(52) U.S. Cl. .............................. 385/24; 385/16; 398/79; 398/82; 398/83
(58) Field of Search ....................... 385/16, 24; 398/79, 398/82, 83

(56) References Cited

U.S. PATENT DOCUMENTS 6,233,074 B1 * 5/2001 Lahat et al. .................. 398/79
6,583,900 B2 * 6/2003 Onaka et al. ................. 398/59
6,594,412 B2 * 7/2003 Maeda et al. ................. 385/17
6,597,830 B1 * 7/2003 Nakabayashi et al. ........ 385/24
2002/0101633 A1 * 8/2002 Onaka et al. ............... 359/119

FOREIGN PATENT DOCUMENTS

JP   11146429    5/1999  ............ H04Q/3/52
JP   2000354006  12/2000 ........... H04B/10/02

* cited by examiner

*Primary Examiner*—Brian Healy
*Assistant Examiner*—Daniel Petkovsek
(74) *Attorney, Agent, or Firm*—Katten Muchin Zavis Rosenman

(57) ABSTRACT

An input signal line is split and guided to a 2×1 switch and a drop unit by an optical coupler. The 2×1 switch guides the signal from the optical coupler or a signal from a second 2×2 switch to a first 2×2 switch. The first 2×2 switch guides the signal from the 2×1 switch or a signal from an add unit to an inter-station line or the second 2×2 switch. The second 2×2 switch guides the signal to a 2×1 switch for an inter-station line to which the signal is output. The add unit guides a signal to a first 2×2 switch for an inter-station line to which the signal is added. The drop unit guides a signal from a desired inter-station line to an intra-station line.

15 Claims, 27 Drawing Sheets

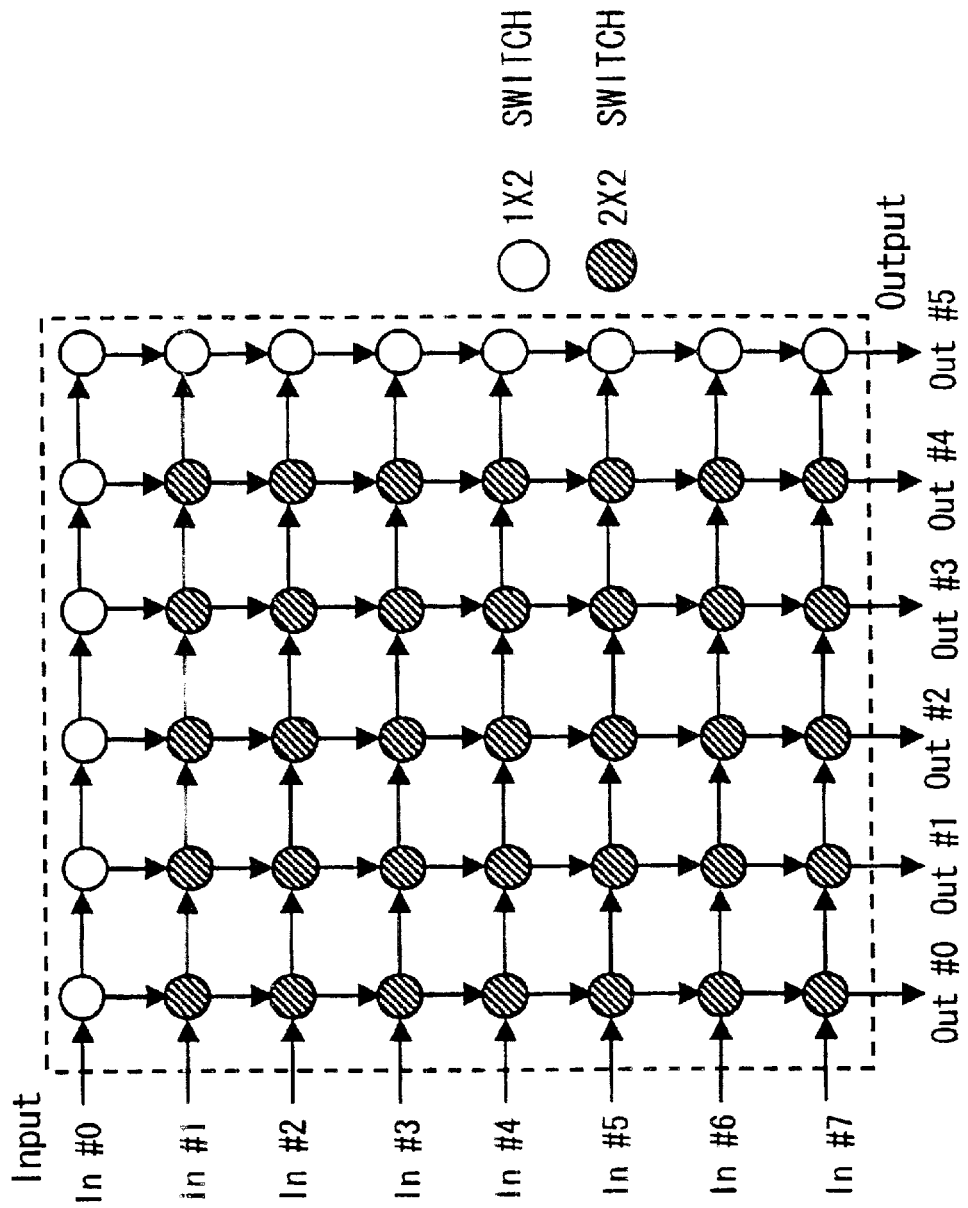
F I G. 2

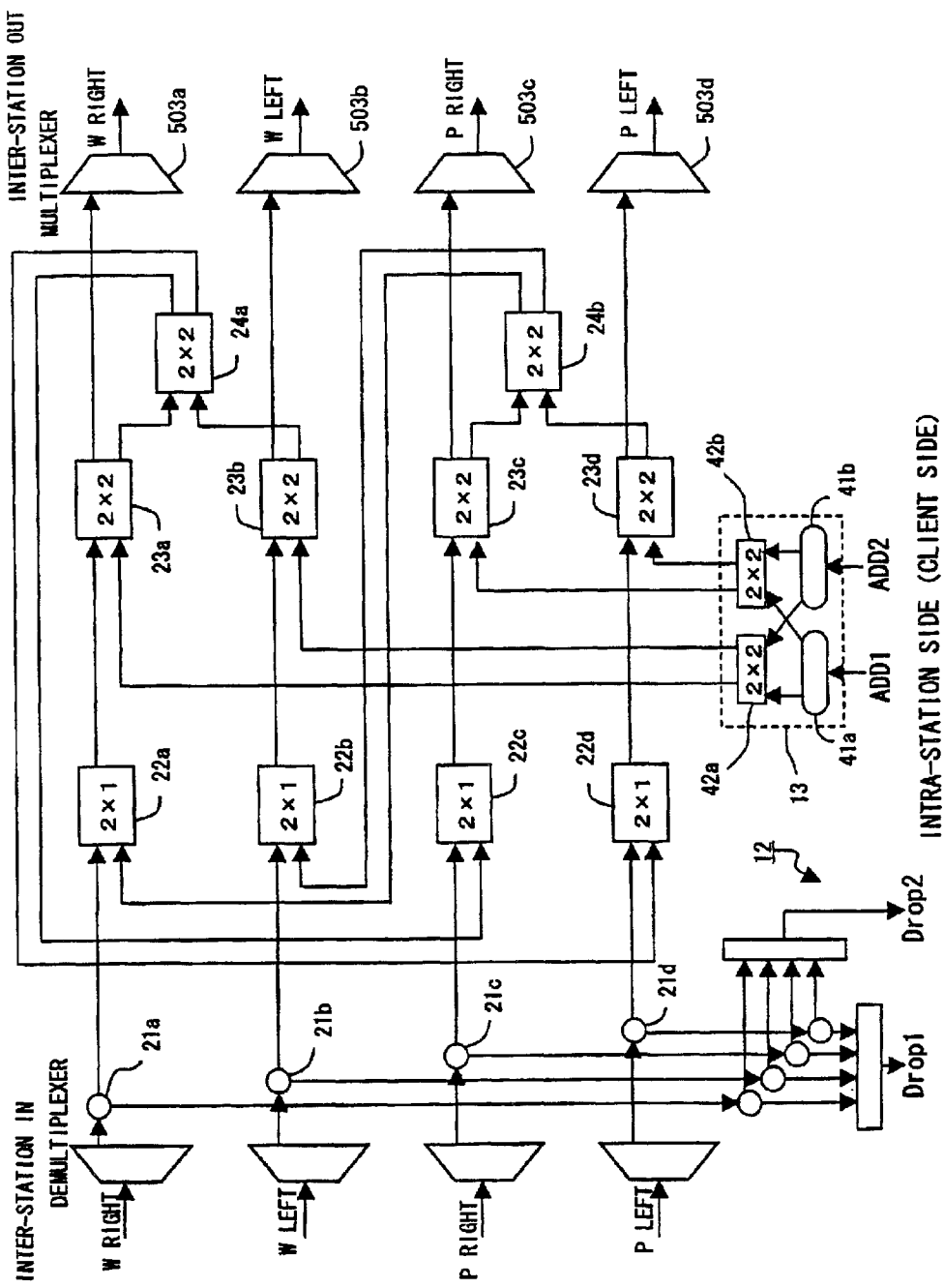
F I G. 6

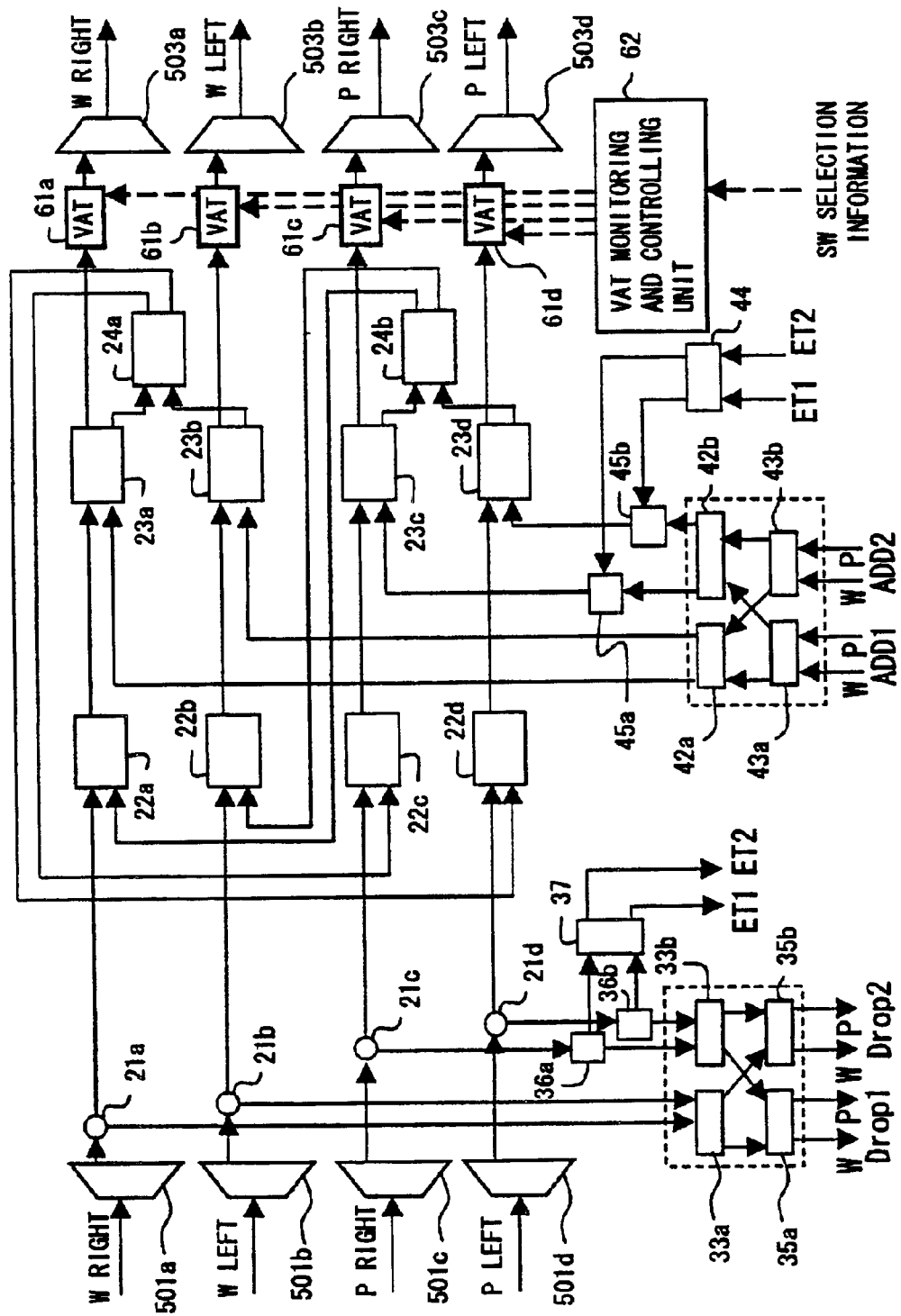
F I G. 1 6

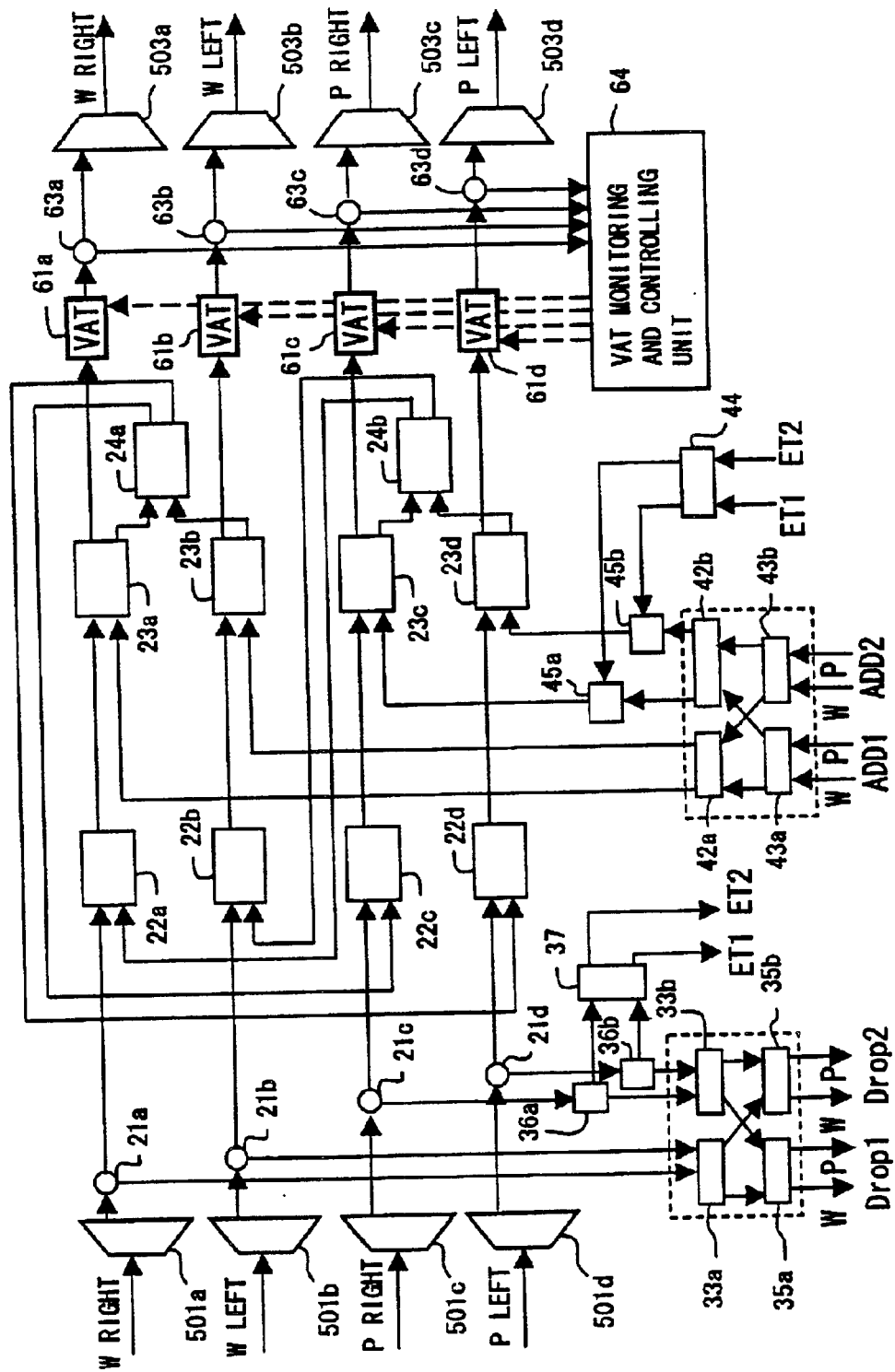
F I G. 17

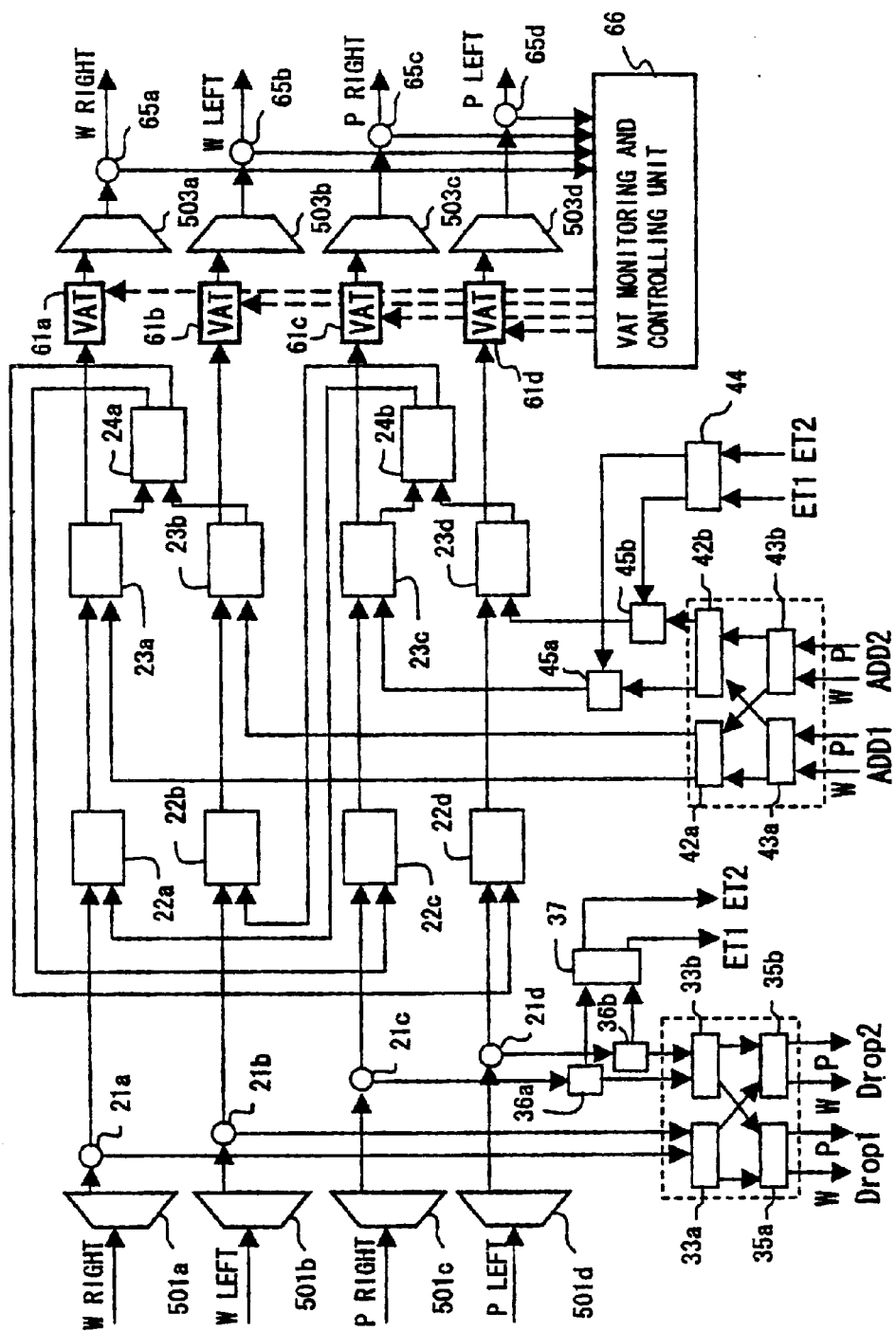
F I G. 18

UPON OCCURRENCE OF FAULT ON PATH A (FULLY DISCONNECTED BETWEEN NODES 2 AND 3)

INITIAL STATE

UPON OCCURRENCE OF FAULT ON PATH B
(FULLY DISCONNECTED BETWEEN NODES 5 AND 6)

INITIAL STATE

US 6,768,831 B2

OPTICAL ADD-DROP MULTIPLEXING APPARATUS

BACKGROUND OF THE INVENTION

1. Field of the Invention

The present invention relates to an optical add-drop multiplexing apparatus, in particular, to that used in a wavelength division multiplexing communication network.

2. Description of the Related Art

In recent years, as the Internet and cellular phones become common and the functions of terminal units are advanced, the bandwidths of access lines become large and the traffic on the network drastically increases. It seems that such a trend will continue in future. Thus, the infrastructure for communication is being enhanced.

To deal with the increase of the traffic of communications, an optical communications network is being constructed. To accomplish a large capacity of a transmission line, wavelength division multiplexing (WDM) communications system is being introduced. In comparison with the improvement of the technology with respect to capacity of the transmission line, the improvement of the technology with respect to speed of communication nodes (transmission devices) is insufficient. Thus, it is pointed out that the communication nodes will become a bottleneck of the network.

Consequently, in a network using the WDM system for accomplishing a large capacity of a transmission line, communication nodes that allow signals to be processed at high speed are required. The mainstream of the network topology is of ring type. The communication nodes are sometimes accomplished by optical add-drop multiplexing apparatuses.

FIG. 1 is a schematic diagram showing the structure of an example of a conventional optical add-drop multiplexing (ADM) apparatus. Referring to FIG. 1, four input-side inter-station lines and four output-side inter-station lines are connected to the optical ADM apparatus. In this example, the inter-station lines are backbone transmission lines that connect communication nodes and transmit multi-wavelength light (λ1 to λn).

Wavelength demultiplexers 501a to 501d demultiplex multi-wavelength light received through the input-side inter-station lines into signals of individual wavelengths. Cross point switches 502 are disposed corresponding to the individual wavelengths. Input signals are guided to corresponding output ports. FIG. 1 shows a cross point switch 502 corresponding to a wavelength λ1. Wavelength multiplexers 503a to 503d multiplex outputs of each cross point switch 502 and output the multiplexed signals to the output-side inter-station lines.

The optical ADM apparatus is provided with an add port and a drop port. The add port is used to receive a signal to be added to an inter-station line. The drop port is used to output a signal branched from an inter-station line to an intra-station line. However, a signal that is input through the add port is branched to a set of signals by an optical coupler that functions as an optical splitter and then guided to the cross point switch 502.

Thus, the cross point switch 502 has eight input ports and six output ports and is realized by an 8×6 switch. As shown in FIG. 2, the cross point switch 502 (8×6 switch) is composed of thirty five 2×2 switches and thirteen 1×2 switches.

With the structure, a signal that is input from any input-side inter-station line can be guided to a desired output-side inter-station line or a desired intra-station line. In addition, a signal that is input from an intra-station line through the add port can be guided to a desired output-side inter-station line.

FIG. 3 is a schematic diagram showing the structure of another example of a conventional optical ADM apparatus. In this optical ADM apparatus, an optical switch is divided into a plurality of portions. In other words, the optical ADM apparatus comprises 3×2 switches 511a to 511d, a 4×4 switch 512, 2×2 switches 513a and 513b, and a 4×2 switch 514. The 3×2 switches 511a to 511d are disposed corresponding to the individual inter-station lines. The 4×4 switch 512 are used to switch the route of a signal upon occurrence of a fault. The 2×2 switches 513a and 513b are used to add a signal to a desired inter-station line. The 4×2 switch 514 is used to guide a signal branched from an inter-station line to an intra-station line. With this structure, a signal that is input from any line can be guided to a desired line.

However, when large optical switches are used with the currently available technology, various problems take place. Thus, although the 8×6 cross point switch shown in FIG. 2 can be accomplished, it cannot be obtain the high reliability. In addition, the production cost of the switch becomes very high. Thus, considering these points, at least at the present time, the structure of the optical ADM apparatus shown in FIG. 1 is not preferable.

In the optical ADM apparatus shown in FIG. 3, a 4×4 switch, 3×2 switches, a 4×2 switch, and so forth are used instead of a large cross point switch. However, considering the reliability and the production cost, it cannot be said that they are preferable devices for accomplishing an optical ADM apparatus. In other words, it is desired to accomplish an optical ADM apparatus composed of smaller optical switches than those used so far.

When an optical switch used in an optical ADM apparatus gets defective, the defective optical switch is replaced with a new optical switch. Thus, when a large optical switch is used, the unit to be replaced becomes large. In other words, when a large optical switch is maintained, not only a service with respect to a defective line, but a service without respect thereto may have to be stopped.

SUMMARY OF THE INVENTION

An object of the present invention is to provide an optical ADM apparatus with high reliability. Another object of the present invention is to provide an optical ADM apparatus that can be maintained with a minimum of change or stop of services.

An optical add/drop multiplexing apparatus of the present invention is connected to first to fourth input lines, first to fourth output lines, an add line, and a drop line, and this apparatus comprises: four first optical devices for splitting signals that are input from the first to fourth input lines, respectively; four first switches disposed corresponding to the first to fourth output lines, respectively; four second switches disposed corresponding to the first to fourth output lines, respectively; a pair of third switches; a drop unit for guiding a signal split by the first optical devices to the drop line; and an add unit for guiding a signal received from the add line to the second switches. One of the pair of third switches guides a signal received from second switches corresponding to the first and second output lines to first switches corresponding to the third and fourth output lines. The rest of the pair of third switches guides a signal received from second switches corresponding to the third and fourth output lines to first switches corresponding to the first and second output lines. The four first switches output signals split by the first optical devices or signals received from the third switches. The four second switches output signals received from the corresponding first switches or signals received from the add unit to the corresponding output lines.

With this structure, the number of inputs of the first switch is "2", whereas the number of outputs thereof is "1". Thus, the first switch can be accomplished by one switching device. In addition, the number of inputs of each of the second switch and the third switch is "2", whereas the number of outputs thereof is "2". Thus, each of the second switch and the third switch can be accomplished by one switching device. Such switching devices can be produced relatively easily at low cost with high reliability. Thus, an optical Add-Drop multiplexing apparatus with high reliability can be accomplished.

BRIEF DESCRIPTION OF DRAWINGS

FIG. 2 is a schematic diagram showing the structure of a cross connect switch used in the optical ADM apparatus shown in FIG. 1;

FIG. 6 through FIG. 19 are schematic diagrams showing the structure of an optical ADM apparatus according to first through fourteenth features of the present invention, respectively;

DESCRIPTION OF PREFERRED EMBODIMENTS

With reference to the accompanying drawings, embodiments of the present invention will be described.

Figure 4:
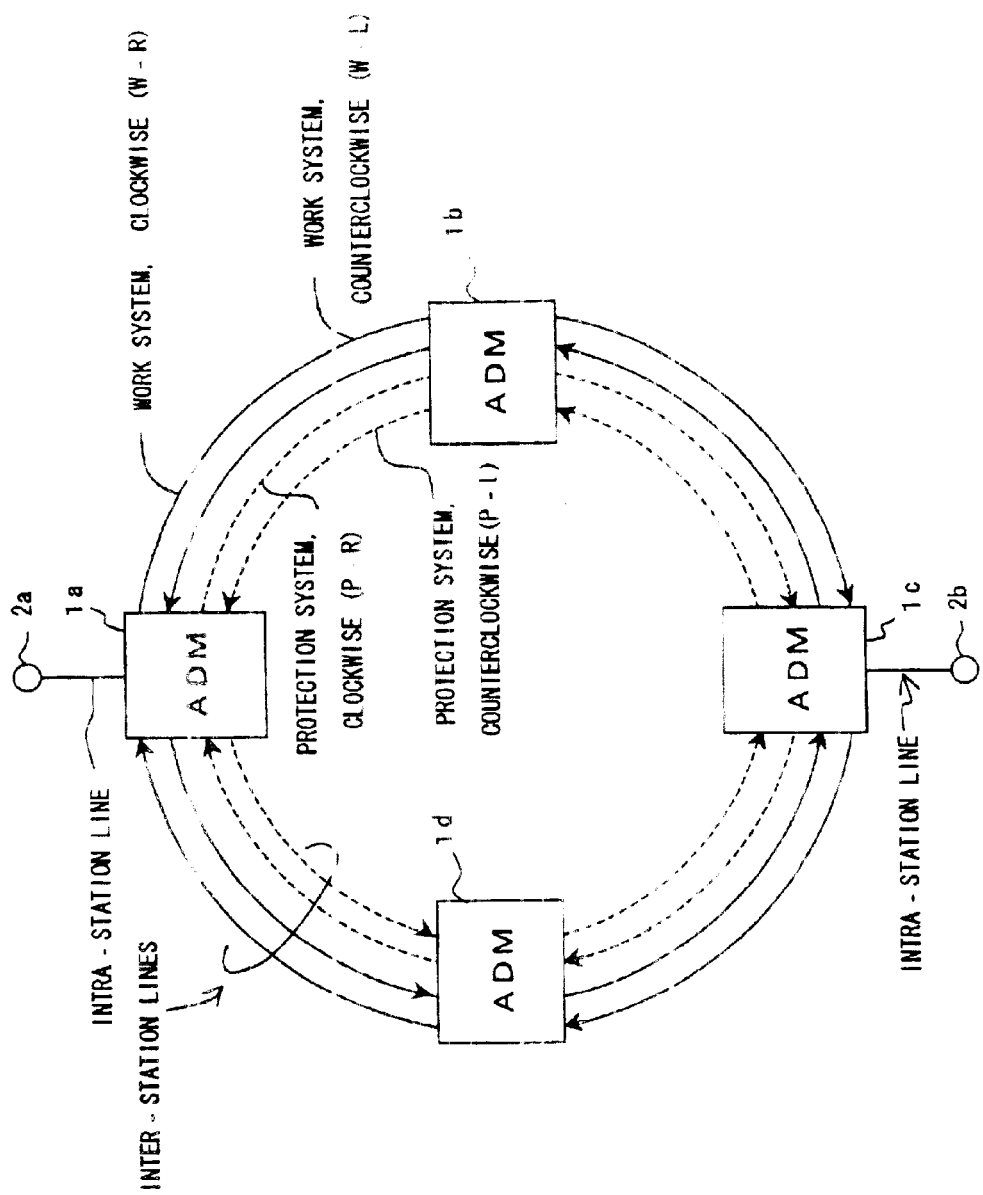
FIG. 4 is a schematic diagram showing the configuration of a network that uses an optical ADM apparatus according to an embodiment of the present invention.

FIG. 4 is a schematic diagram showing the structure of a network that uses optical add-drop multiplexing apparatuses (optical ADM apparatuses) according to an embodiment of the present invention. Referring to FIG. 4, a plurality of optical ADM apparatuses 1a to 1d are connected in a ring shape. However, the present invention is not limited to such a topology.

Each optical ADM apparatus is connected by four optical transmission lines (optical fiber lines). With these optical transmission lines, a ring-shaped network is structured. That is, a work clockwise transmission line, a work counterclockwise transmission line, a protection clockwise transmission line, and a protection counterclockwise transmission line are provided. In this example, "active system" and "backup system" may be referred to as "W (Work)" and "P (Protection)", respectively. In addition, "clockwise" and "counterclockwise" may be referred to as "right-hand rotation" and "left-hand rotation", respectively. Moreover, an optical transmission line that connects optical ADM apparatuses may be referred to as "inter-station line".

On an inter-station line, basically a signal that has been multiplexed in WDM (Wavelength Division Multiplexing) is transmitted. In this example, it is assumed that wavelengths $\lambda 1$ to $\lambda n$ are used to transmit signals. In addition, basically, signals are transmitted through the work transmission line. When a fault takes place or the work transmission line is maintained, the protection transmission line is used. However, as will be described later, the network can provide a service in such a way that while a regular signal is transmitted through the work transmission line, a low priority signal is transmitted through the protection transmission line.

Each of the optical ADM apparatuses 1a to 1d receives a signal via an input-side inter-station line and outputs the signal to a corresponding output-side inter-station line. In addition, each of the optical ADM apparatuses 1a to 1d can accommodate at least one intra-station line. An intra-station line is an optical transmission line that connects an optical ADM apparatus and a terminal unit or another node. In the example shown in FIG. 4, a terminal unit 2a is connected to the optical ADM apparatus 1a through an intra-station line and a terminal unit 2b is connected to the optical ADM apparatus 1c through an intra-station line. Each of the optical ADM apparatuses 1a to 1d has a function for adding a signal received through an intra-station line to an inter-station line and another function for guiding a signal received through an inter-station line to an intra-station line. The former function is referred to as "add", whereas the latter function is referred to as "drop".

In addition, the network shown in FIG. 4 provides UPSR (Unidirectional Path Switched Ring). In other words, each of the optical ADM apparatuses 1a to 1d provides a function for performing the UPSR. The UPSR allows one signal to be transmitted through different routes so as to prevent a service from stopping upon occurrence of a fault. That is, when data is transmitted from the terminal unit 2a to the terminal 2b, the optical ADM apparatus 1a transmits the signal from the terminal unit 2b to the optical ADM apparatus 1c in the clockwise direction. In addition, the optical ADM apparatus 1a transmits the same signal to the optical ADM apparatus 1c in the counterclockwise direction. The optical ADM apparatus 1c selects one of the two signals received from the optical ADM apparatus 1a and transfers the selected signal to the terminal 2b through an intra-station line.

When a fault takes place on the network, a protection inter-station line is used. In this case, an optical ADM apparatus that deals with the fault performs a process for guiding a signal received through the work transmission line to the protection transmission line or a process for guiding a signal received through the protection transmission line to the work transmission line.

In such a manner, each optical ADM apparatus can guide a signal received through any inter-station line to a desired inter-station line or a desired intra-station line and guide a signal received through an intra-station line to a desired inter-station line.

Figure 5:
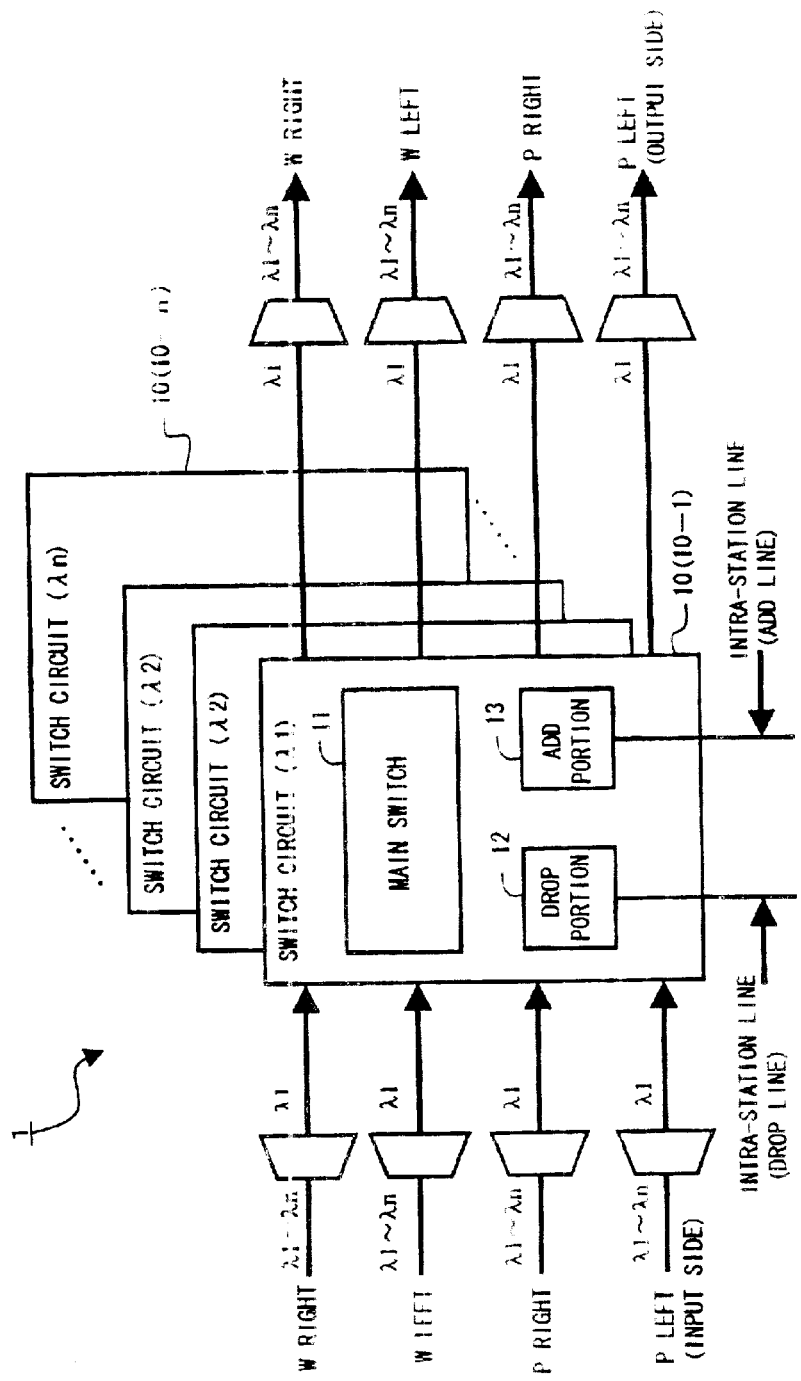
FIG. 5 is a schematic diagram showing a simplified structure of an optical ADM apparatus according to an embodiment of the present invention.

FIG. 5 is a schematic diagram showing a simplified structure of an optical ADM apparatus 1 according to an embodiment of the present invention. The optical ADM apparatus 1 represents one of the optical ADM apparatuses 1a to 1d shown in FIG. 4. Four input-side inter-station lines, four output-side inter-station lines, and intra-station lines are connected to the optical ADM apparatus 1.

Multi-wavelength light (λ1 to λn) is input from each input-side inter-station line. Each multi-wavelength light is demultiplexed into signals with individual wavelengths by wavelength demultiplexers 501a to 501d. The demultiplexed signals are guided to corresponding switch circuits 10-1 to 10-n.

The switch circuits 10-1 to 10-n are optical switch circuits disposed corresponding to individual wavelengths. The switch circuits 10-1 to 10-n guide input signals to output lines designated by a controller (not shown). The structure of each of the switch circuits 10-1 to 10-n is the same. Each of the switch circuits 10-1 to 10-n is provided with a main switch portion 11, a drop unit 12, and an add unit 13. The controller controls the states of switching devices of the main switch portion 11, the drop unit 12, and the add unit 13.

Under the control of the controller (not shown), the main switch portion 11 connects an input-side inter-station line and an output-side inter-station line; an input-side inter-station line and the drop unit 12; or the add unit 13 and an output-side inter-station line. The drop unit 12 accommodates an intra-station line (drop line) and guides a signal split by the main switch portion 11 to an intra-station line. The add unit 13 accommodates an intra-station line (add line) and guides a signal received through an intra-station line to the main switch portion 11.

Signals that are output from the switch circuits 10-1 to 10-n are multiplexed by wavelength multiplexers 503a to 503d. The wavelength multiplexed signal is transmitted to the next optical ADM apparatuses through an inter-station line.

FIG. 6 is a schematic diagram showing the structure of an optical ADM apparatus according to a first feature of the present invention. As was described with reference to FIG. 5, an optical ADM apparatus 1 has a plurality of switch circuits 10-1 to 10-n. However, FIG. 6 shows only one of the switch circuits.

Signals that are output from wavelength demultiplexers 501a to 501d are split (or branched) by optical couplers 21a to 21d. The optical couplers 21a to 21d function as optical splitters. One of signals split by each of the optical couplers 21a to 21d is guided to a first input port of each of 2×1 switches 22a to 22d, whereas the other signal is guided to a drop unit 12.

The second input ports of the 2×1 switches 22a, 22b, 22c, and 22d are connected to a first output port of a 2×2 switch 24b, a second output port of the 2×2 switch 24b, a first output port of a 2×2 switch 24a, and a second output port of the 2×2 switch 24a, respectively. In addition, signals that are output from the 2×1 switches 22a to 22d are guided to first input ports of 2×2 switches 23a to 23d, respectively.

Signals that are output from the add unit 13 are guided to second input ports of the 2×2 switches 23a to 23d, respectively. Signals that are output from the first output ports of the 2×2 switches 23a to 23d are guided to wavelength multiplexers 503a to 503d, respectively. On the other hand, signals that are output from second output ports of the 2×2 switches 23a and 23b are guided to the 2×2 switch 24a. Signals that are output from second output ports of the 2×2 switches 23c and 23d are guided to the 2×2 switch 24b.

As was described above, signals that are output from the 2×2 switches 24a and 24b are guided to the 2×1 switches 22a to 22d, respectively.

In FIG. 6, the main switch portion 11 is composed of the optical couplers 21a to 21d, the 2×1 switches 22a to 22d, the 2×2 switches 23a to 23d, and the 2×2 switches 24a and 24b.

The drop unit 12 has optical couplers 31a to 31d and 4×1 switches 32a and 32b. The drop unit 12 accommodates two intra-station lines (Drop-1 and Drop-2).

The optical couplers 31a to 31d split signals received from the optical couplers 21a to 21d, respectively. The optical couplers 31a to 31d function as optical splitters. One signal split by each of the optical couplers 31a to 31d is guided to the 4×1 switch 32a, whereas the other signal split thereby is guided to the 4×1 switch 32b. The 4×1 switch 32a guides one of the signals received from the optical couplers 31a to 31d to the intra-station line (Drop-1). On the other hand, the 4×1 switch 32b guides one of the signals received from the optical couplers 31a to 31d to the intra-station line (Drop-2).

The add unit 13 has optical couplers 41a and 41b and 2×2 switches 42a and 42b. In addition, the add unit 13 accommodates two intra-station lines (Add-1 and Add-2).

The optical coupler 41a splits a signal received through the intra-station line (Add-1) and guides the split signals to the 2×2 switches 42a and 42b. On the other hand, the optical coupler 41b splits a signal received through the intra-station line (Add-2) and guides the split signals to the 2×2 switches 42a and 42b. The optical couplers 41a and 41b function as optical splitter.

A first output port of the 2×2 switch 42a is connected to a second input port of the 2×2 switch 23a. A second output port of the 2×2 switch 42a is connected to a second input port of the 2×2 switch 23b. Likewise, a first output port of the 2×2 switch 42b is connected to a second input port of the 2×2 switch 23c. A second output port of the 2×2 switch 42b is connected to a second input port of the 2×2 switch 23d.

In this structure, the 2×1 switches 22a to 22d are disposed so as to guide signals received from the input-side inter-station lines to corresponding output-side inter-station lines. The 2×2 switches 23a to 23d are disposed so as to select signals received through intra-station lines or signals received through intra-station lines and to guide the selected signals to corresponding output-side inter-station lines. The 2×2 switches 24a and 24b are disposed so as to guide a signal to be output to the work line to the protection line and to guide a signal to be output to the protection line to the work line.

Next, the operation of the optical ADM apparatus 1 shown in FIG. 6 will be described.

When a signal received from an adjacent optical ADM apparatus through an inter-station line is transmitted to the next optical ADM apparatus as it is, the 2×1 switches 22a to 22d and the 2×2 switches 23a to 23d are placed in "bar" state. Thus, a signal received through the input-side inter-station line (W-right) is guided to the output-side inter-station line (W-right) through the optical coupler 21a, the 2×1 switch 22a, and the 2×2 switch 23a. Likewise, a signal received through another input-side inter-station line is guided to a corresponding output-side inter-station line.

Here, in a 2×1 switch, the "bar state" represents the state that a signal of a first input port is guided to an output port, whereas the "cross state" represents the state that a signal of a second input port is guided to an output port. In a 2×2 switch, the "bar state" represents the state that a signal of a first input port is guided to a first output port and a signal of a second input port is guided to a second output port, whereas the "cross state" represents the state that a signal of a first input port is guided to a second output port, whereas a signal of a second input port is guided to a first output port.

When a signal received through an input-side inter-station line is dropped to an intra-station line, the 4×1 switch 32a or 32b selects a corresponding input port. For example, when a signal received through the input-side inter-station line (W-right) is dropped to the intra-station line (Drop-1), the 4×1 switch 32a selects an input port connected to the optical coupler 31a.

In the optical ADM apparatus 1, a signal that is input from an inter-station line is guided to both an output-side inter-station line and the drop unit 12 by the optical couplers 21a to 21d. Thus, while the optical ADM apparatus 1 relays a signal that is input from an intra-station line to the next optical ADM apparatus, the optical ADM apparatus 1 can drop the same signal to an intra-station line. In the drop unit 12, a signal that is input from an intra-station line is guided to both the 4×1 switches 32a and 32b by the optical couplers 31a to 31d. Thus, the same signal can be dropped to the two intra-station lines (Drop-1 and Drop-2).

When a signal received from an intra-station line is added to an inter-station line, the 2×2 switch 23a to 23d corresponding to an output-side inter-station line to which the signal is to be added is placed in the "cross state". In addition, the 2×2 switch 42a or 42b is controlled so that the signal to be added is guided to a corresponding 2×2 switch 23a to 23d. For example, when a signal received from the intra-station line (Add-1) is added to the inter-station line (W-right), the 2×2 switch 23a is placed in the "cross state". The 2×2 switch 42a is controlled so that the signal is guided to the 2×2 switch 23a.

When the UPSR is performed, the 2×2 switches 23a to 23d corresponding to two output-side inter-station lines to which the signal is added are placed in the "cross state". In addition, the 2×2 switches 42a and 42b are controlled so that the signal to be added is guided to the corresponding 2×2 switch 23a to 23d. For example, when a signal received from the intra-station line (Add-1) is added to both the inter-station line (W-right) and the inter-station line (P-left), the 2×2 switches 23a and 23d are placed in the "cross state". In addition, the 2×2 switches 42a and 42b are controlled so that the signal is guided to the 2×2 switches 23a and 23d.

In a network that performs the UPSR, when a signal received from one route is the same as a signal received from the other route, the drop unit 12 selects one of the received signals. For example, when the same signal is received from the inter-station line (W-right) and the inter-station line (P-left) and the signal received from the inter-station line (W-right) is dropped to an intra-station line, the 4×1 switch 32a or 32b selects a signal received from the optical coupler 31a.

When a fault takes place, signals received from the work lines (W-right and W-left) are switched to the protection lines (P-right and P-left), respectively. Alternatively, signals received from the protection lines are switched to the work lines, respectively. In this case, the 2×2 switch 23 (23a to 23d) corresponding to a line to which a signal whose route should be changed is input is placed in the "cross state". In addition, the 2×2 switch 24a or 24b connected to that 2×2 switch 23 is placed in the "cross state" or the "bar state" depending on whether the signal should be transmitted in the clockwise direction or the counterclockwise direction. In addition, the 2×1 switch 22 (22a to 22d) connected to the 2×2 switch 24 is placed in the "cross state". Moreover, the 2×2 switch 23 (23a to 23d) connected to the 2×1 switch 22 is placed in the "bar state".

For example, when a signal that is input from the inter-station line (W-right) is guided to the inter-station line (P-right), the 2×2 switch 23a and the 2×1 switch 22c are placed in the "cross state". Here, it is assumed that the other switches are basically placed in the "bar state". In this case, a signal that is input from the inter-station line (W-right) is guided to the inter-station line (P-right) through the 2×1 switch 22a, the 2×2 switch 23a, the 2×2 switch 24a, the 2×1 switch 22c, and the 2×2 switch 23c. Alternatively, when a signal that is input from the inter-station line (W-right) is guided to the inter-station line (P-left), the 2×2 switch 23a, the 2×2 switch 24a, and the 2×1 switch 22d are placed in the "cross state". In this case, a signal that is input from the inter-station line (W-right) is guided to the inter-station line (P-left) through the 2×1 switch 22a, the 2×2 switch 23a, the 2×2 switch 24a, the 2×1 switch 22d, and the 2×2 switch 23d.

Figure 1:
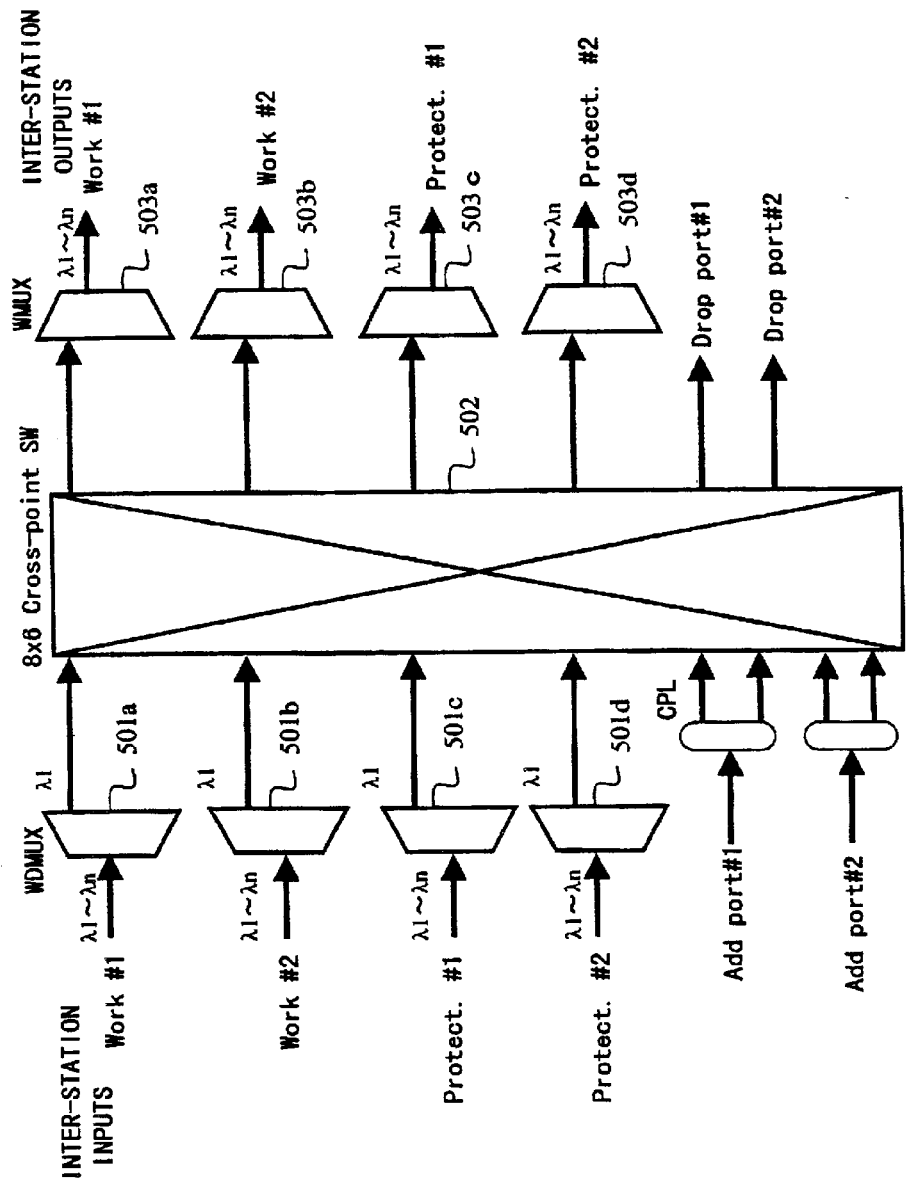
FIG. 1 is a schematic diagram showing the structure of an example of a conventional optical ADM apparatus.
Figure 3:
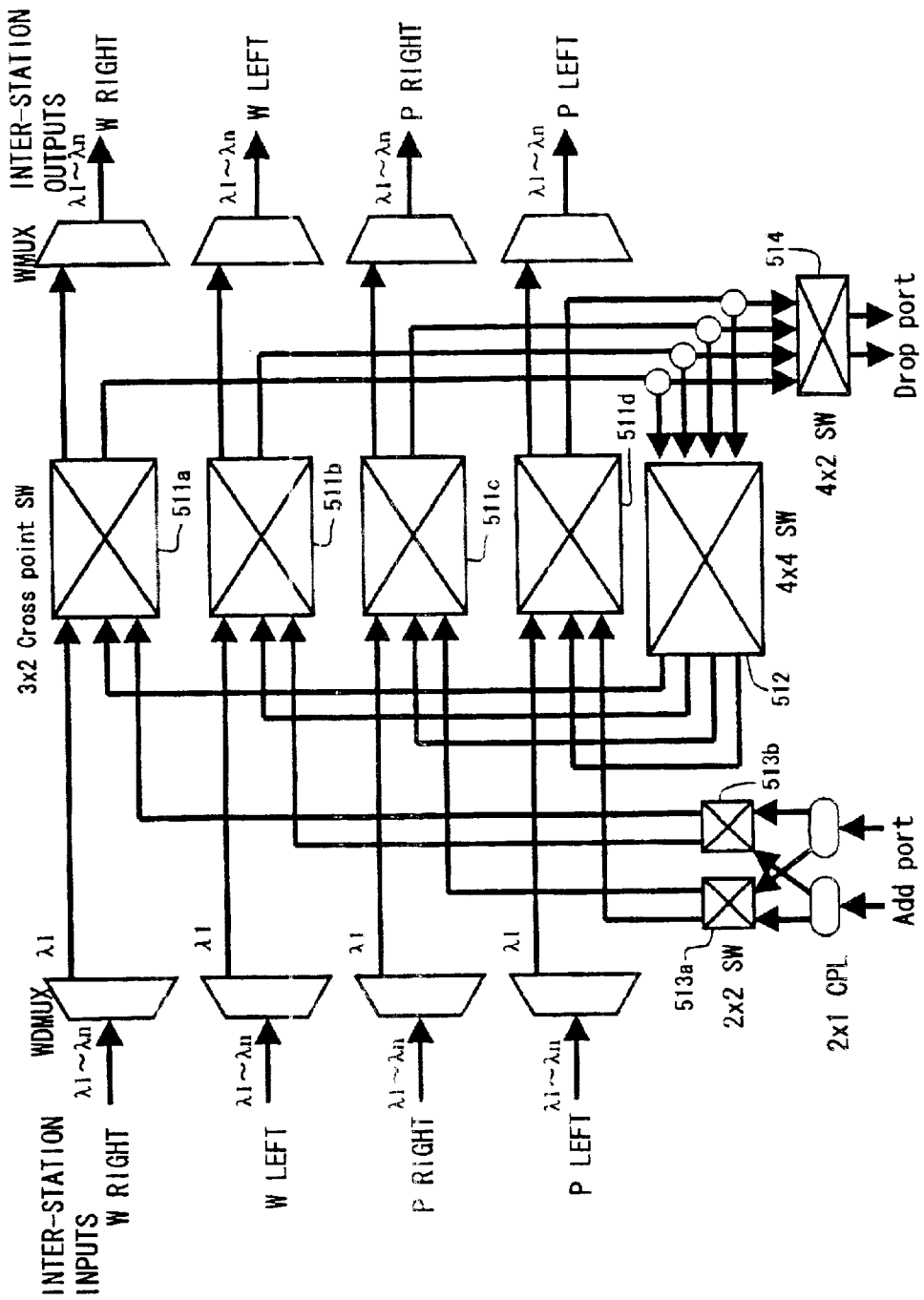
FIG. 3 is a schematic diagram showing the structure of another example of a conventional optical ADM apparatus.

In the structure of the optical ADM apparatus 1 shown in FIG. 6, the number of optical switching devices is much smaller than that in the structure shown in FIG. 1 or 3. In other words, in the optical ADM apparatus shown in FIG. 1, as was described with reference to FIG. 2, 48 optical switching devices are required. On the other hand, in the structure shown in FIG. 3, the 3×2 switch, the 4×4 switch, and the 4×2 switch require 6, 16, and 8 optical switching devices, respectively. Thus, a total of 50 (=6×4+16+8+2) optical switching devices are required.

In contrast, the optical ADM apparatus 1 shown in FIG. 6 has eight 2×2 switches, four 2×1 switches, and two 4×1 switches. Here, one 4×1 switch can be composed of three 2×1 switches. In addition, each of the 2×2 switch and the 2×1 switch can be accomplished by one optical switching device, respectively. Thus, the total number of optical switching devices that the optical ADM apparatus 1 has is 18 (=8+4+3×2).

In addition, switching devices (2×2 switches, 2×1 switches, and so forth) used in the optical ADM apparatus according to the embodiment can be accomplished by reflection type switches that use a technology called MEMS (Micro Mechanical Machine System), Mach-Zehnder type switches, directional coupling type switches, or the like. In particular, since the reflection type switches using the MEMS technology are small and can be easily controlled, they contribute to the size reduction of the switch circuit. As an example of the material of the switching devices, semiconductor, $LiNbO_3$ or the like is used.

Figure 7:
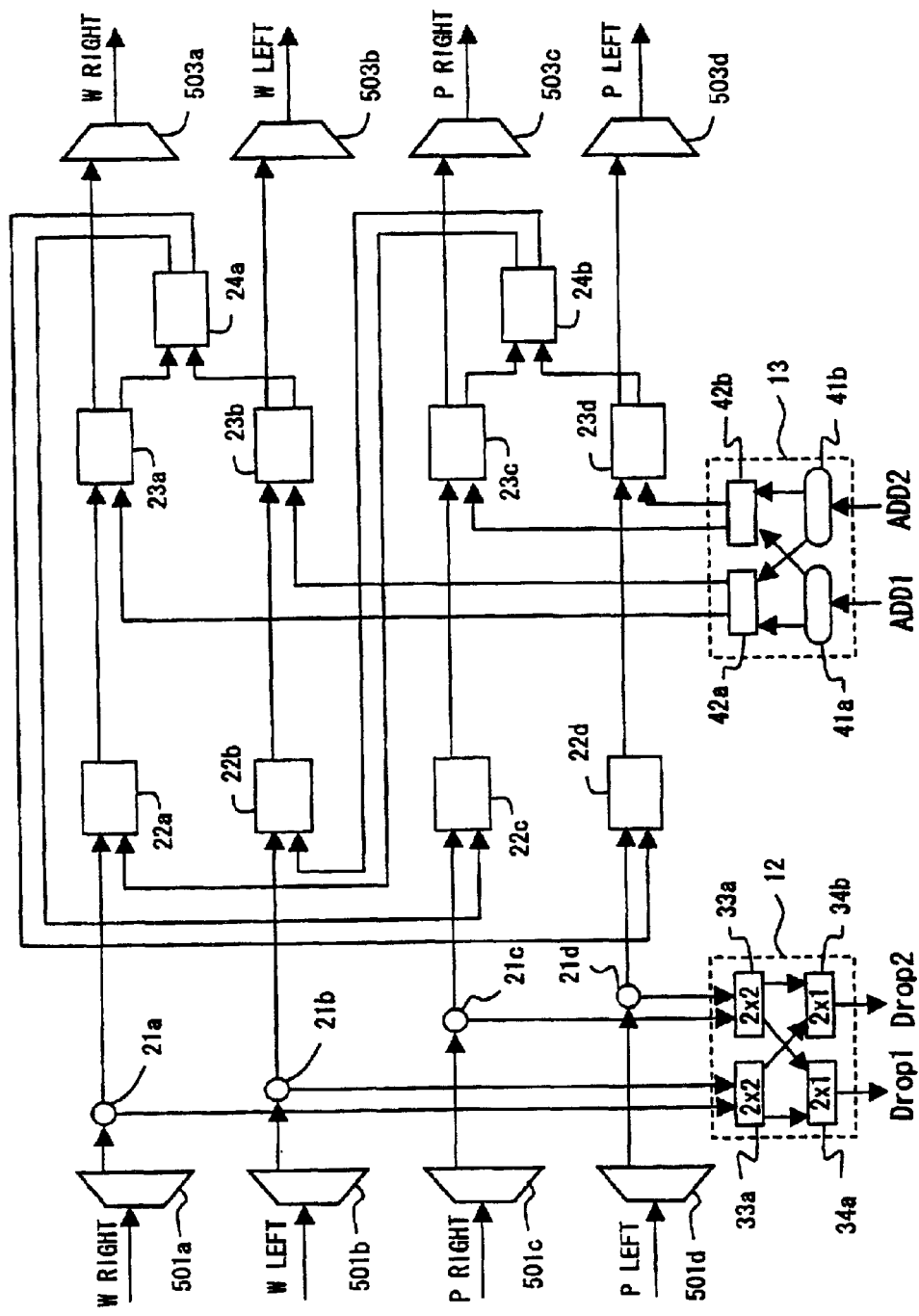

FIG. 7 is a schematic diagram showing the structure of an optical ADM apparatus according to a second feature of the present invention. The structure of the optical ADM apparatus according to the second feature is different from that according to the first feature shown in FIG. 6 in the drop unit 12.

The drop unit 12 of the optical ADM apparatus according to the second feature has 2×2 switches 33a and 33b and 2×1 switches 34a and 34b. The 2×2 switch 33a guides signals received through the inter-station lines (W-right and W-left) to the 2×1 switch 34a and/or the 2×1 switch 34b. Likewise, the 2×2 switch 33b guides signals received through the inter-station lines (P-right and P-left) to the 2×1 switch 34a and/or 34b. In addition, the 2×1 switch 34a guides one of signals received from the 2×2 switches 33a and 33b to the intra-station line (Drop-1). Likewise, the 2×1 switch 34b guides one of signals received from the 2×2 switches 33a and 33b to the intra-station line (Drop-2).

The optical ADM apparatus shown in FIG. 7 has ten 2×2 switches and six 2×1 switches. Thus, the number of optical switching devices that the optical ADM apparatus has amounts to 16 (=10+6).

Since the operation of the optical ADM apparatus according to the second feature is basically the same as that according to the above-described first feature, the description thereof will be omitted.

Figure 8:
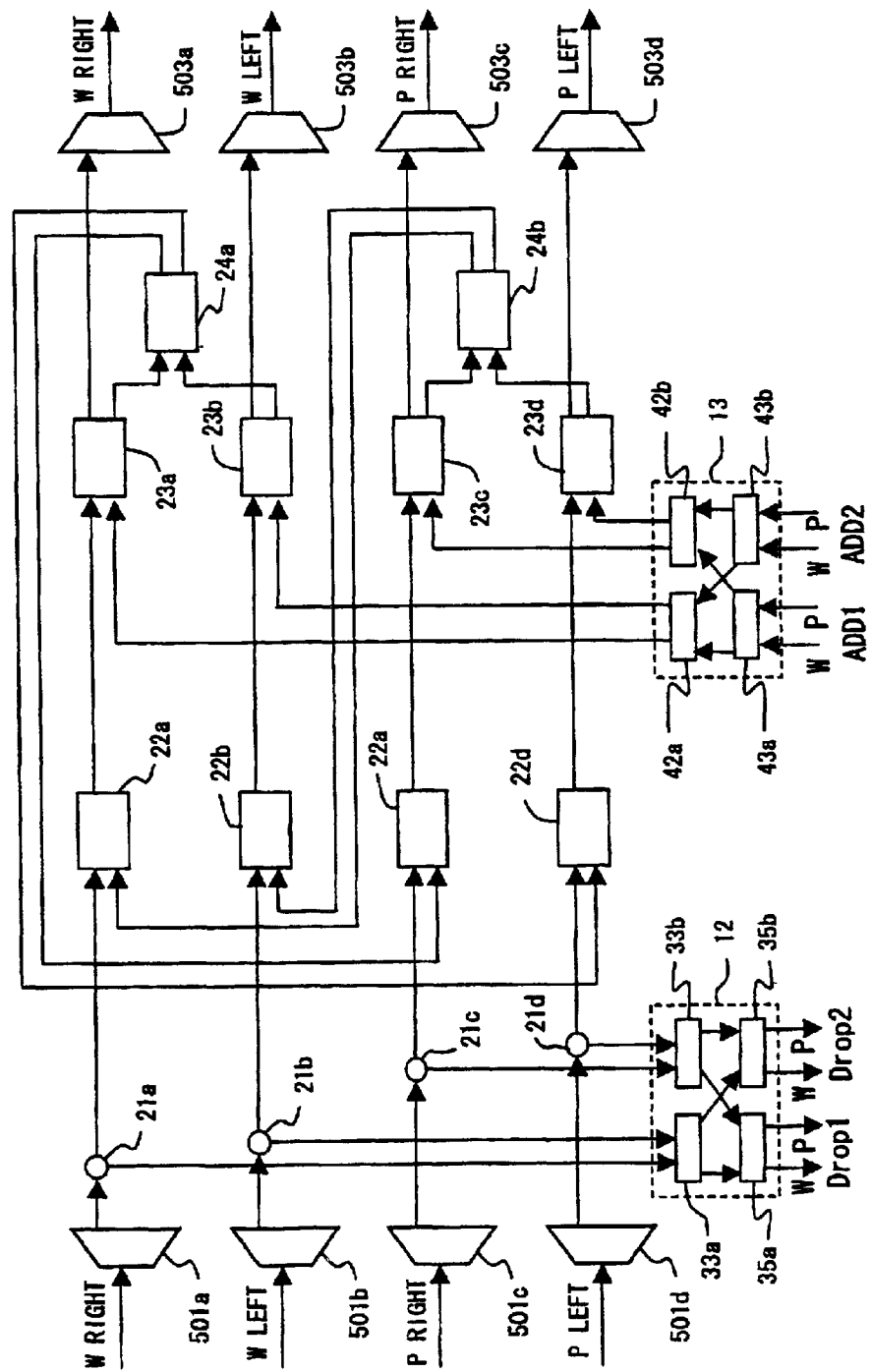

FIG. 8 is a schematic diagram showing the structure of an optical ADM apparatus according to a third feature of the present invention. It is assumed that in a system that uses the optical ADM apparatus according to the third feature, a work system and a protection system are disposed for not only inter-station lines, but inter-station lines. In the example, four intra-station lines (Drop-1-W, Drop-1-P, Drop-2-W, and Drop-2-P) are connected to the drop unit 12. Likewise, four intra-station lines (Add-1-W, Add-1-P, Add-2-W, and Add-2-P) are connected to the add unit 13.

The drop unit 12 has four 2×2 switches 33a, 33b, 35a, and 35b. The 2×2 switch 33a guides signals received through the inter-station lines (W-right and W-left) to the 2×2 switch 35a and/or 35b. Likewise, the 2×2 switch 33b guides signals received through the inter-station lines (P-right and P-left) to the 2×2 switch 35a and/or 35b. In addition, the 2×2 switch 35a guides signals received from the 2×2 switches 33a and 33b to the intra-station lines (Drop-1-W and Drop-1-P), respectively. Likewise, the 2×2 switch 35b guides signals received from the 2×2 switches 33a and 33b to the intra-station lines (Drop-2-w and Drop-2-P), respectively.

With the above-described structure, a signal that is received from a particular inter-station line can be dropped to a desired line of four intra-station lines.

The add unit 13 has four 2×2 switches 42a, 42b, 43a, and 43b. The 2×2 switch 43a guides signals received through the intra-station lines (Add-1-W and Add-1-P) to the 2×2 switch 42a and/or 42b. Likewise, the 2×2 switch 43b guides signals received through the intra-station lines (Add-2-W and Add-2-P) to the 2×2 switch 42a and/or 42b. In addition, the 2×2 switch 42a guides signals received from the 2×2 switches 43a and 43b to the 2×2 switches 23a and 23b. Likewise, the 2×2 switch 42b guides signals received from the 2×2 switches 43a and 43b to the 2×2 switches 23c and 23d.

With this structure, a signal that is input from a work intra-station line or a protection intra-station line can be added to a desired inter-station line.

Figure 9:
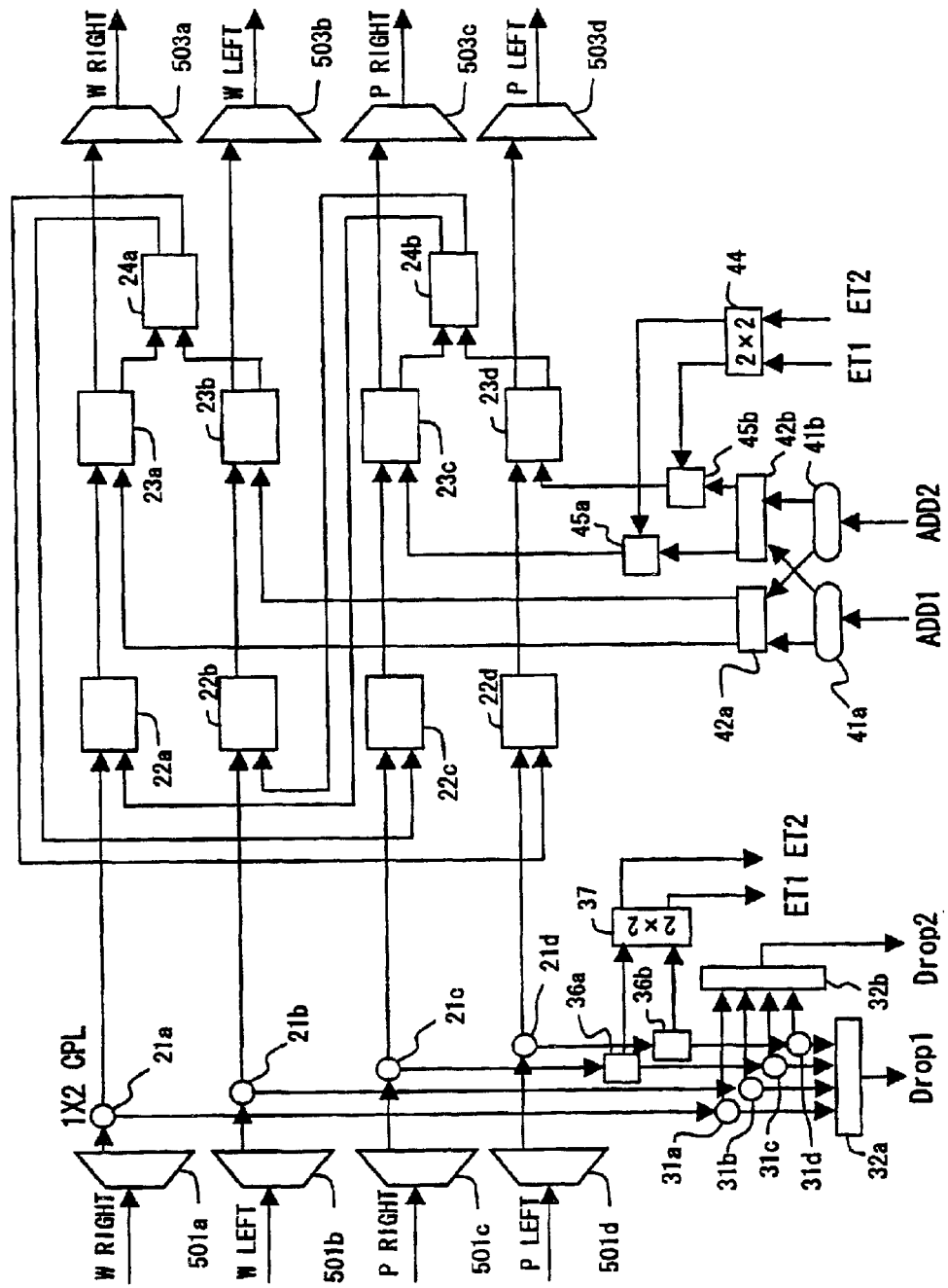

FIG. 9 is a schematic diagram showing the structure of an optical ADM apparatus according to a fourth feature of the present invention. The optical ADM apparatus according to the fourth feature is used in a system of which there are both a regular signal and a low priority signal. In this example, a regular signal is basically transmitted through the work line. On the other hand, a low priority signal is transmitted through the protection line when the protection line is not used for the regular signal. Thus, when the regular signal is transmitted through the protection line due to any reason, the transmission of the low priority signal is stopped. In the specification, the low priority signal may be referred to as "extra traffic".

The basic structure of the optical ADM apparatus according to the fourth feature is the same as that according to the first feature shown in FIG. 6 except that the drop unit 12 has a function for dropping a low priority signal and that the add unit 13 has a function for adding a low priority signal. The drop unit 12 accommodates four intra-station lines (Drop-1, Drop-2, ET-1, and ET-2). The add unit 13 accommodates four intra-station lines (Add-1, Add-2, ET-1, and ET-2).

In addition to the optical couplers 31a to 31d and the 4×1 switches 32a and 32b shown in FIG. 6, the drop unit 12 has 1×2 switches 36a and 36b and a 2×2 switch 37. The 1×2 switch 36a is disposed between an optical coupler 21c and an optical coupler 31c. A signal received form the optical coupler 21c is guided to the optical coupler 31c or the 2×2 switch 37. On the other hand, the 1×2 switch 36b is disposed between an optical coupler 21d and an optical coupler 31d. A signal received from the optical coupler 21d is guided to the optical coupler 31d or the 2×2 switch 37. The 2×2 switch 37 guides signals that are output from the 1×2 switches 36a and 36b to the intra-station lines (ET-1 and ET-2).

In addition to the optical couplers 41a and 41b and the 2×2 switches 42a and 42b shown in FIG. 6, the add unit 13 has a 2×2 switch 44 and 2×1 switches 45a and 45b. The 2×2 switch 44 guides signals received from the intra-station lines (ET-1 and ET-2) to the 2×1 switches 45a and 45b. The 2×1 switch 45a is disposed between the 2×2 switch 42a and the 2×2 switch 23c. The 2×1 switch 45a selects a signal received from the 2×2 switch 42b or a signal received from the 2×2 switch 44 and guides the selected signal to the 2×2 switch 23c. On the other hand, the 2×1 switch 45b is disposed between the 2×2 switch 42b and the 2×2 switch 23d. The 2×1 switch 45b selects a signal received from the 2×2 switch 42b or a signal received from the 2×2 switch 44 and guides the selected signal to the 2×2 switch 23d.

In this structure of the optical ADM apparatus, when a low priority signal is added to an inter-station line, the 2×2 switch 44 is controlled depending on whether the low priority signal is to be transmitted in the clockwise direction or the counterclockwise direction. In addition, the 2×1 switches 45a and 45b are controlled so that a signal received from the 2×2 switch 44 is selected. Moreover, the 2×2 switch 23c or 23d is controlled so that a signal received from the 2×1 switch 45a or 45b is guided to an output-side inter-station line, respectively.

For example, when a low priority signal received from the intra-station line (ET-1) is added to the inter-station line (P-right), the 2×2 switch 44 is placed in the "cross state". The 2×1 switch 45a is controlled so that a signal received from the 2×2 switch 44 is selected. The 2×2 switch 23c is placed in the "cross state". Thus, the low priority signal received from the intra-station line (ET-1) is guided to the inter-station line (P-right) through the 2×2 switch 44, the 2×1 switch 45a, and the 2×2 switch 23c.

When the protection inter-station lines (P-right and P-left) are used to transmit regular signals, the 2×1 switches 45a and 45b are controlled so that a signal received from the 2×2 switch 42b is selected. Thus, the low priority signal is not added to the inter-station line.

When a low priority signal received from an inter-station line is dropped, the 1×2 switches 36a and 36b are controlled so that signals received from the optical couplers 21c and 21d are guided to the 2×2 switch 37. The 2×2 switch 37 is controlled so that the received signals are guided to the predetermined intra-station lines (ET-1 or ET-2).

For example, when a low priority signal is dropped from the inter-station line (P-right) to the intra-station line (ET-1), the 1×2 switch 36a is controlled so that a signal received from the optical coupler 21c is guided to the 2×2 switch 37. Then, the 2×2 switch 37 is placed in the "cross state". Thus, the low priority signal received from the inter-station line (P-right) is guided to the intra-station line (ET-1) through the 1×2 switch 36a and the 2×2 switch 37.

When the protection inter-station lines (P-right and P-left) are used to transmit regular signals, the 1×2 switches 36a and 36b are controlled so that signals received from the optical couplers 21c and 21d are guided to the optical couplers 31c and 31d, respectively. Thus, regular signals received through the protection inter-station lines are dropped to the intra-station lines (Drop-1 and Drop-2).

Figure 10:
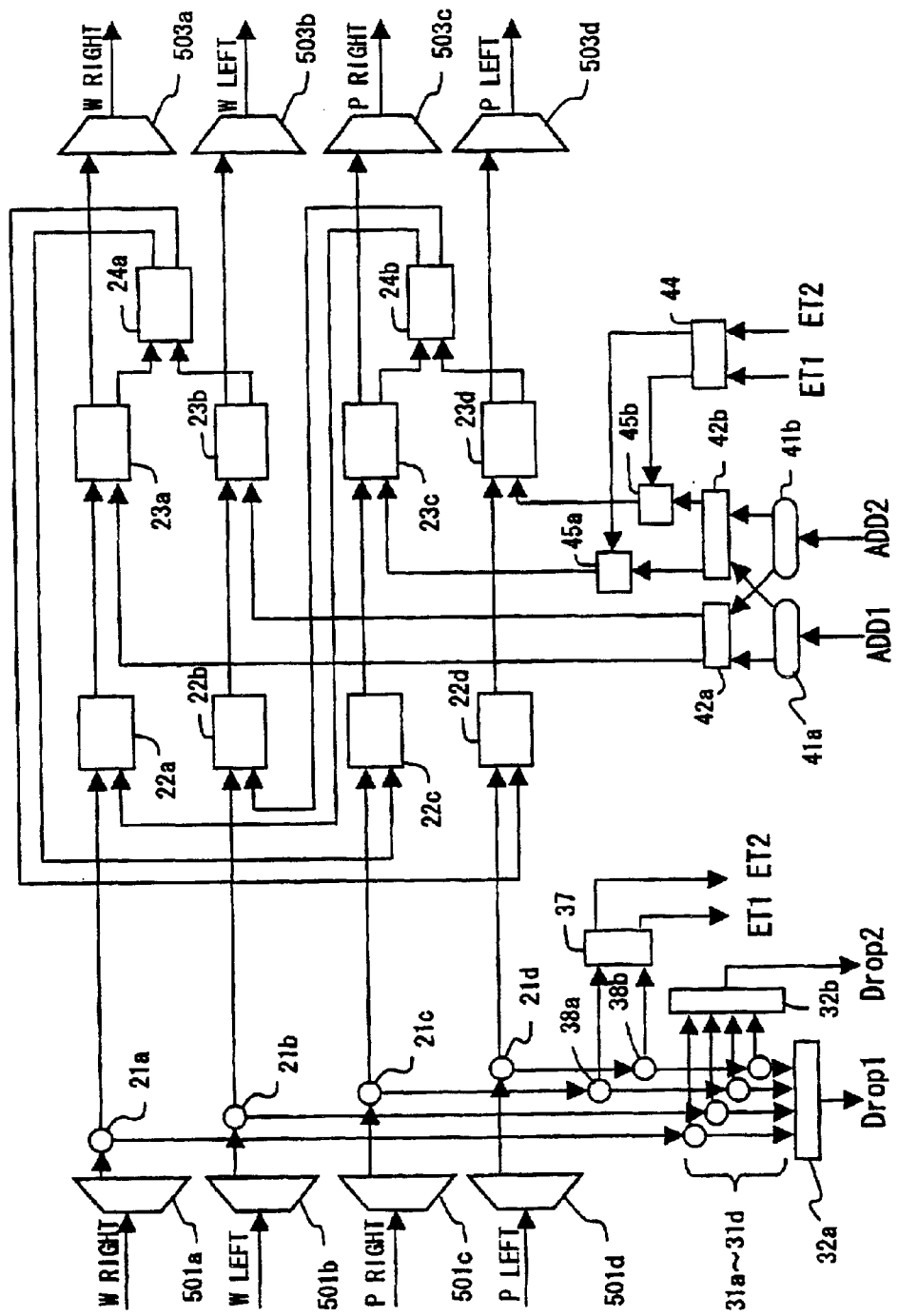

FIG. 10 is a schematic diagram showing the structure of an optical ADM apparatus according to a fifth feature of the present invention. The optical ADM apparatus according to the fifth feature is accomplished by replacing the 1×2 switches 36a and 36b according to the fourth feature shown in FIG. 9 with optical couplers 38a and 38b, respectively. In this feature, the optical coupler 38a guides a signal received from an optical coupler 21c to both the optical coupler 31c and the 2×2 switch 37. On the other hand, the optical coupler 38b guides a signal received from an optical coupler 21d to both the optical coupler 31d and the 2×2 switch 37. The optical couplers 38a and 38b function as optical splitters.

The operation of the optical ADM apparatus according to the fifth feature is basically the same as the operation of the optical ADM apparatus according to the fourth feature. However, in the structure according to the fifth feature, when low priority signals are transmitted through the protection inter-station lines (P-right and P-left), the low priority signals are guided to not only the 2×2 switch 37, but 4×1 switches 32a and 32b. Thus, the 4×1 switches 32a and 32b should be properly controlled so that signals received from the work inter-station lines (W-right and W-left) are selected.

Figure 11:
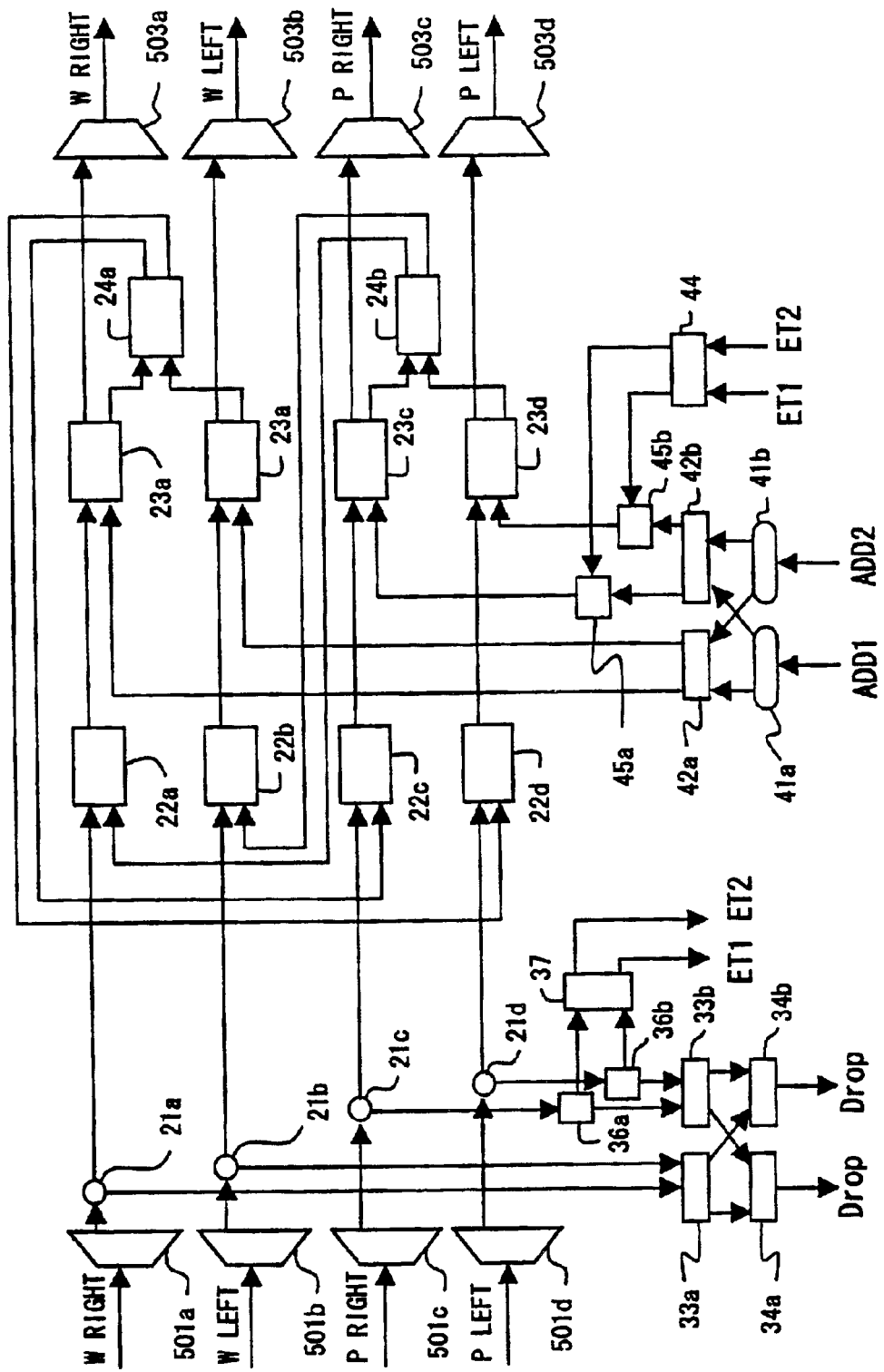

FIG. 11 is a schematic diagram showing the structure of an optical ADM apparatus according to a sixth feature of the present invention. The basic structure of the optical ADM apparatus according to the sixth feature is the same as that according to the second feature shown in FIG. 7 except that the drop unit 12 has a function for dropping a low priority signal and that the add unit 13 has a function for adding a low priority signal.

As with the fourth feature, the function for dropping a low priority signal is accomplished by the 1×2 switches 36a and 36b and the 2×2 switch 37. However, the 1×2 switch 36a guides a signal received from the optical coupler 21c to the 2×2 switch 33b or the 2×2 switch 37. Likewise, the 1×2 switch 36b guides a signal received from the optical coupler 21d to the 2×2 switch 33b or the 2×2 switch 37. On the other hand, as with the fourth feature, the function for adding a low priority signal is accomplished by the 2×2 switch 44 and the 2×1 switches 45a and 45b. Thus, the method for adding/dropping a low priority signal according to the sixth feature is the same as that according to the fourth feature.

Figure 12:
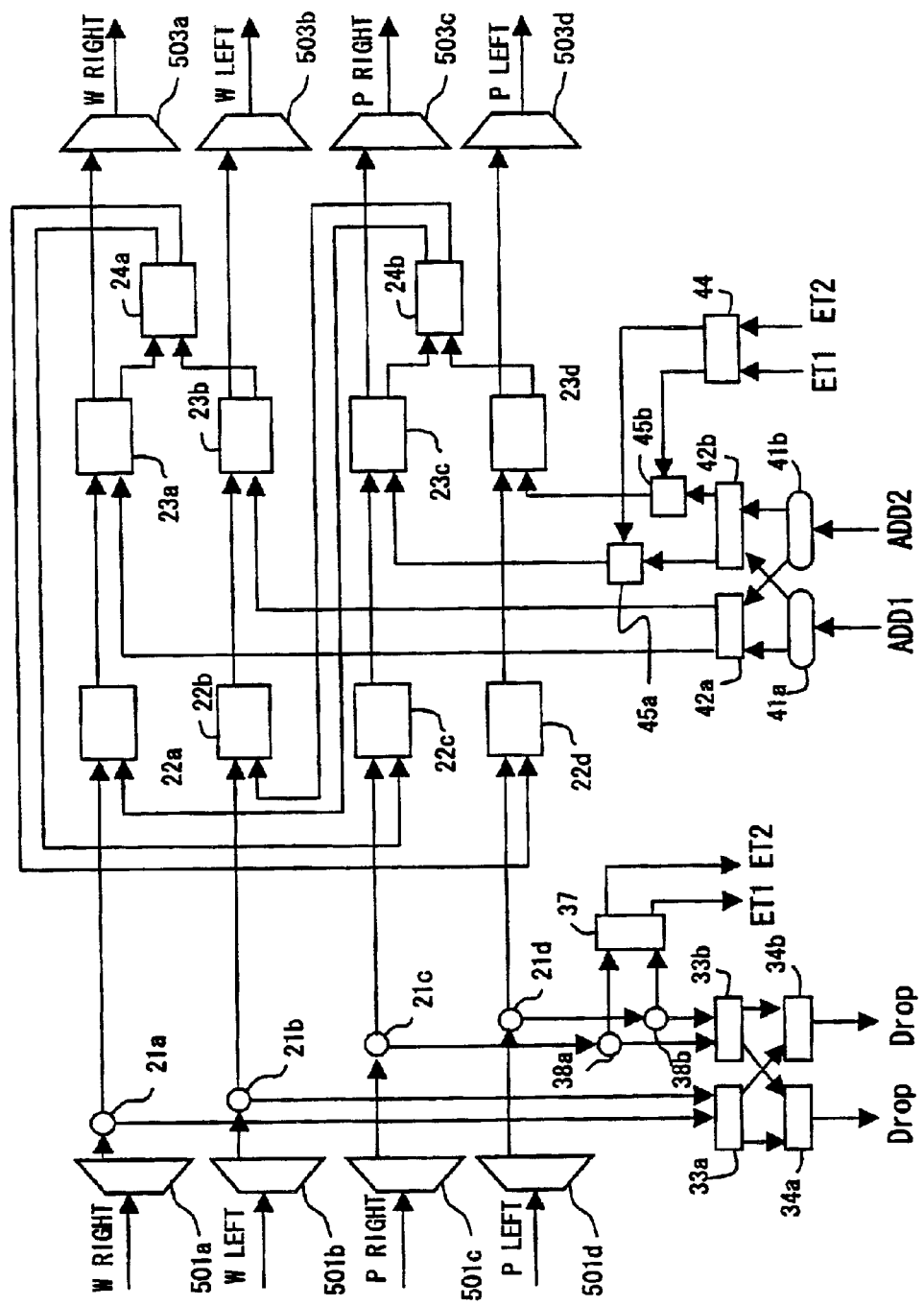

FIG. 12 is a schematic diagram showing the structure of an optical ADM apparatus according to a seventh feature of the present invention. The optical ADM apparatus according to the seventh feature can be accomplished by replacing the 1×2 switches 36a and 36b according to the sixth feature shown in FIG. 11 with the optical couplers 38a and 38b. In this feature, the optical coupler 38a guides a signal received from the optical coupler 21c to both the 2×2 switch 33b and the 2×2 switch 37. Likewise, the optical coupler 38b guides a signal received from the optical coupler 21d to both the 2×2 switch 33b and the 2×2 switch 37. Thus, the method for adding/dropping a low priority signal according to the seventh feature is the same as that according to the fifth feature.

Figure 13:
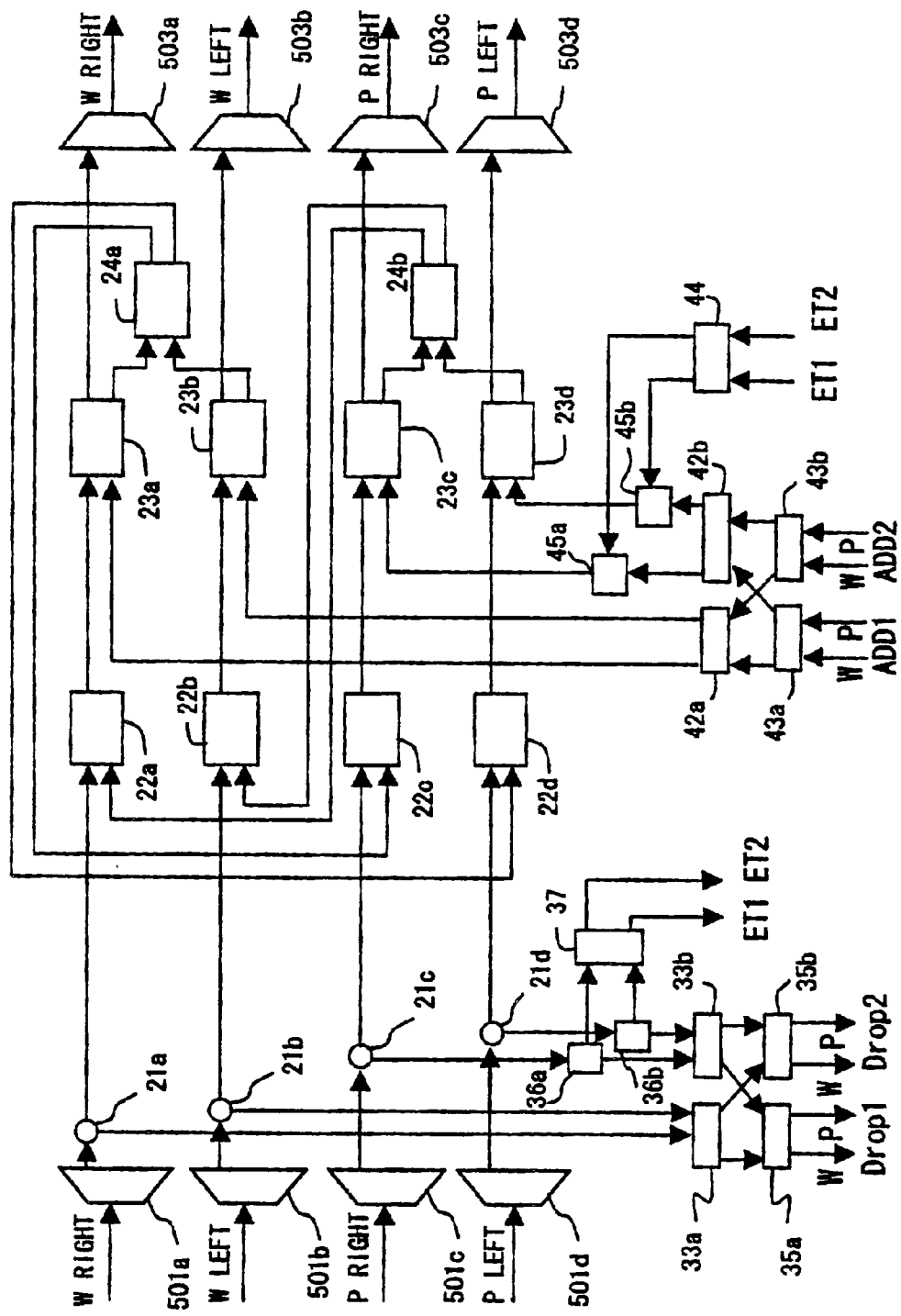

FIG. 13 is a schematic diagram showing the structure of an optical ADM apparatus according to an eighth feature of the present invention. The basic structure of the optical ADM apparatus according to the eighth feature is the same as that according to the third feature shown in FIG. 8 except that the drop unit 12 has a function for dropping a low priority signal and that the add unit 13 has a function for adding a low priority signal.

As with the fourth feature or the sixth feature, the function for dropping a low priority signal is accomplished by the 1×2 switches 36a and 36b and the 2×2 switch 37. Likewise, as with the fourth feature or the sixth feature, the function for adding a low priority signal is accomplished by the 2×2 switch 44 and the 2×1 switches 45a and 45b. Thus, the method for adding/dropping a low priority signal according to the eighth feature is the same as that according to the fourth feature or the sixth feature.

Figure 14:
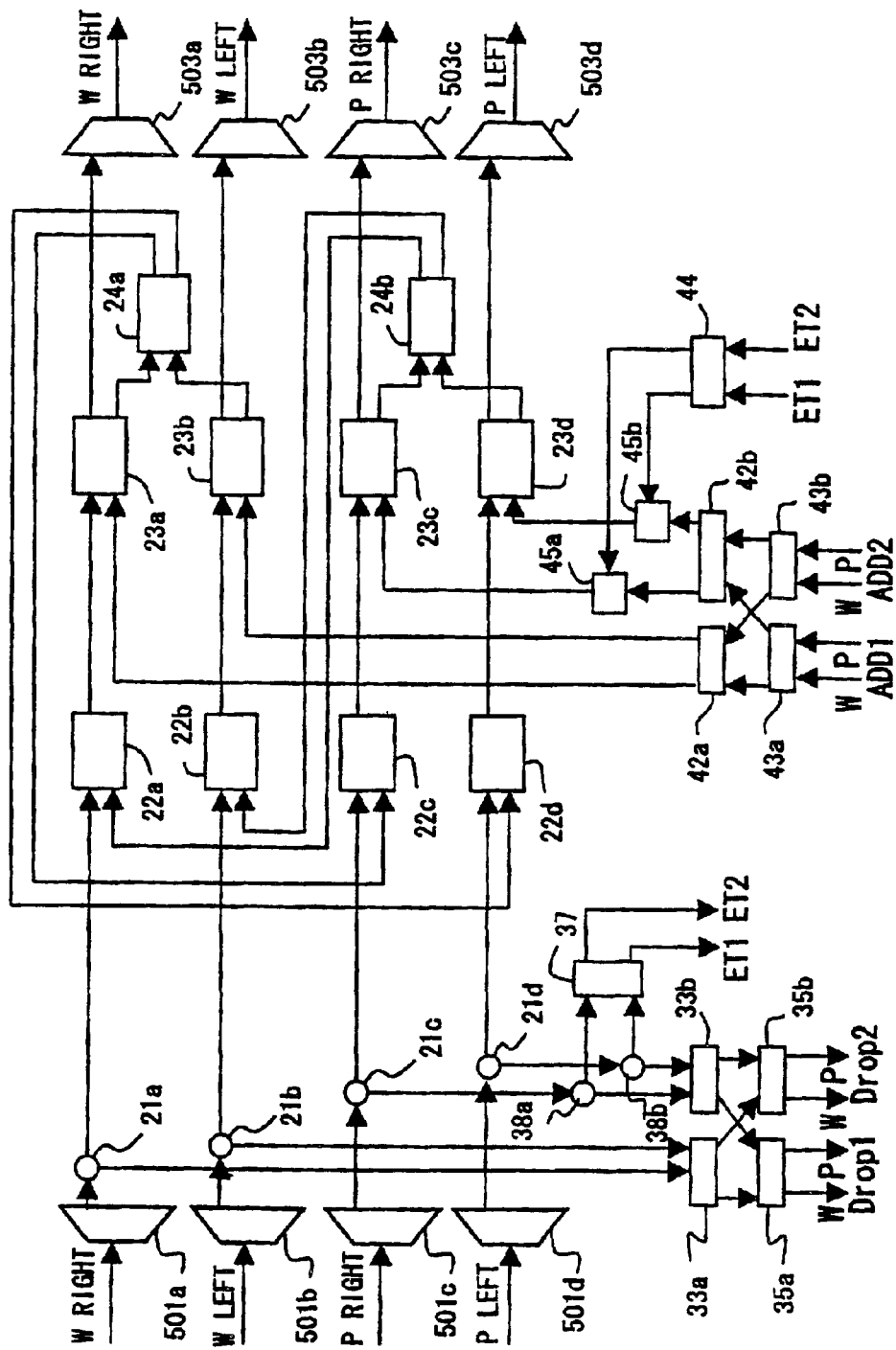

FIG. 14 is a schematic diagram showing the structure of an optical ADM apparatus according to a ninth feature of the present invention. The optical ADM apparatus according to the ninth feature is accomplished by replacing the 1×2 switches 36a and 36b according to the eighth feature shown in FIG. 13 with the optical couplers 38a and 38b, respectively. In this feature, the optical coupler 38a guides a signal received from the optical coupler 21c to both the 2×2 switch 33b and the 2×2 switch 37. Likewise, the optical coupler 38b guides a signal received from the optical coupler 21d to both the 2×2 switch 33b and the 2×2 switch 37. Thus, the method for adding/dropping a low priority signal according to the ninth feature is the same as that according to the fifth feature or the seventh feature.

Figure 15:
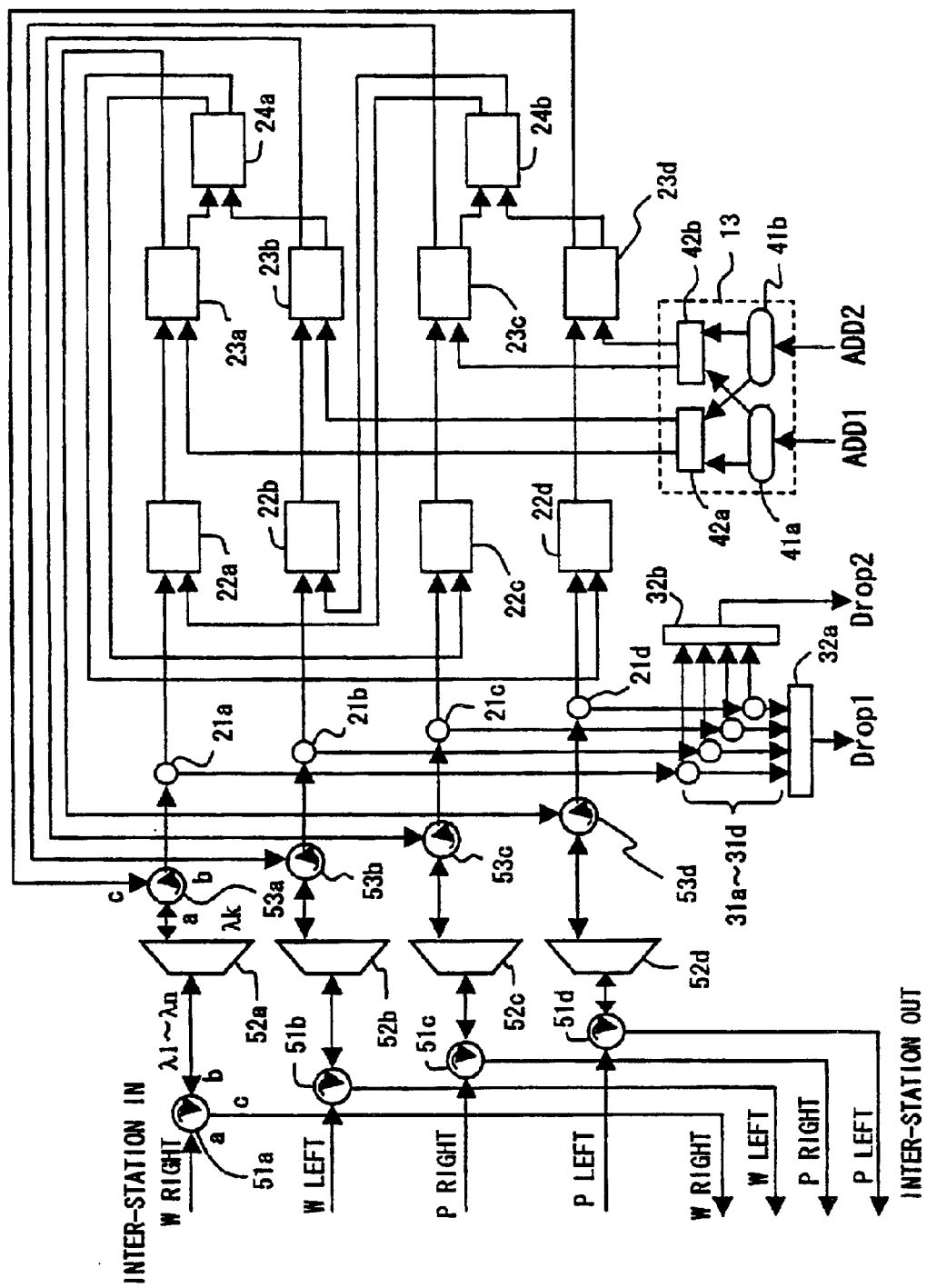

FIG. 15 is a schematic diagram showing the structure of an optical ADM apparatus according to a tenth feature of the present invention. The structure of the drop unit 12 and the add unit 13 according to the tenth feature is the same as the structure shown in FIG. 6. Alternatively, the structure of the drop unit 12 and the add unit 13 may be the same as one of the structures shown in FIGS. 7 to 14.

Referring to FIG. 15, four input-side inter-station lines are connected to a-ports of optical circulators 51a to 51d. On the other hand, four output-side inter-station lines are connected to c-ports of the optical circulators 51a to 51d. b-ports of the optical circulators 51a to 51d are connected to wavelength multiplexing/demultiplexing devices 52a to 52d, respectively. Each of the optical circulators 51a to 51d guides a signal that is input from the a-port to the b-port and guides a signal that is input from the b-port to the c-port. Thus, multi-wavelength light ($\lambda 1$ to $\lambda n$) that is input from the input-side inter-station lines is guided to the wavelength multiplexing/demultiplexing devices 52a to 52d.

The wavelength multiplexing/demultiplexing devices 52a to 52d demultiplex the multi-wavelength light received from the optical circulators 51a to 51d to signals with individual wavelengths and guide the demultiplexed signals to corresponding switch circuits. As was described with reference to FIG. 5, switch circuits are disposed corresponding to the wavelengths.

Signals demultiplexed by the wavelength multiplexing/demultiplexing devices 52a to 52d are guided to a-ports of optical circulators 53a to 53d. b-ports of the optical circulators 53a to 53d are connected to the optical couplers 21a to 21d, respectively. c-ports of the optical circulators 53a to 53d are connected to first output ports of 2×2 switches 23a to 23d, respectively. Each of the optical circulators 53a to 53d guides a signal that is input from the a-port to the b-port and guides a signal that is input from the c-port to the a-port. Thus, signals demultiplexed by the wavelength multiplexing/demultiplexing devices 52a to 52d are guided to the optical couplers 21a to 21d, respectively. In addition, signals that are output from first output ports of the 2×2 switches 23a to 23d are guided to the wavelength multiplexing/demultiplexing devices 52a to 52d, respectively.

Since the structures of the optical couplers 21a to 21d, the 2×1 switches 22a to 22d, the 2×2 switches 23a to 23d, the 2×2 switches 24a and 24b, the drop unit 12, and the add unit 13 according to the tenth feature are the same as those shown in FIGS. 6 to 14, their description will be omitted.

In this structure, multi-wavelength light that is input from the input-side inter-station lines is guided to the wavelength multiplexing/demultiplexing devices 52a to 52d by the optical circulators 51a to 51d, respectively. The multi-wavelength light is demultiplexed to signals with individual wavelengths. The demultiplexed signals are guided to the optical couplers 21a to 21d by the optical circulators 53a to 53d, respectively.

The operations of the optical couplers 21a to 21d, the 2×1 switches 22a to 22d, the 2×2 switches 23a to 23d, the 2×2 switches 24a and 24b, the drop unit 12, and the add unit 13 of the optical ADM apparatus according to the tenth feature are the same as those of the optical ADM apparatuses described above. Thus, signals to be guided to output-side inter-station lines are output from the 2×2 switches 23a to 23d, respectively. The signals that are output from the 2×2 switches 23a to 23d are guided to the wavelength multiplexing/demultiplexing devices 52a to 52d by the optical circulators 53a to 53d, respectively. These signals are multiplexed with signals that are output from the other switch circuits. Multi-wavelength light that is output from the wavelength multiplexing/demultiplexing devices 52a to 52d is guided to output-side inter-station lines by the optical circulators 51a to 51d, respectively. When signals received from the intra-station lines (Add-1 and Add-2) are added to particular inter-station lines, the signals are guided to the inter-station lines through the 2×2 switch 23, the optical circulator 53, the wavelength multiplexing/demultiplexing device 52, and the optical circulator 51 corresponding thereto.

FIG. 16 is a schematic diagram showing the structure of an optical ADM apparatus according to an eleventh feature of the present invention. According to the eleventh feature, the structures of the main switch portion 11, the drop unit 12, and the add unit 13 may be the same as those shown in FIGS. 6 to 15.

The optical ADM apparatus according to the eleventh feature has a function for compensating the light levels of signals corresponding to the number of switching devices through which these signals pass. This function is accomplished by variable attenuators (VATs) 61a to 61d and a VAT monitoring and controlling unit 62. The variable attenuators (VATs) 61a to 61d are disposed between first output ports of the 2×2 switches 23a to 23d and wavelength multiplexers 503a to 503d, respectively. The VAT monitoring and controlling unit 62 controls the attenuation amounts of each of the variable attenuators (VATs) 61a to 61d.

The VAT monitoring and controlling unit 62 generates control signals for controlling the variable attenuators 61a to 61d according to the states of the individual switches of the optical ADM apparatus. That is, the VAT monitoring and controlling unit 62 detects the number of switches through which signals guided to the individual output-side inter-station lines have passed in the optical ADM apparatus corresponding to switch selection information and generates control signals corresponding to the number of switches that has been detected. The switch selection information is information that designates the states of each switch (for example, bar state/cross state). The switch selection information is generated by a controller (not shown).

When a signal that is input from the inter-station line (W-right) is guided to the inter-station line (W-right) as it is, since the signal is guided to an output-side inter-station line through the 2×1 switch 22a and the 2×2 switch 23a, the number of switches through which the signal has passed is "2". On the other hand, when a signal that is input from the inter-station line (W-right) is output to the inter-station line (P-left), since the signal is guided to an output-side inter-station line through the 2×1 switch 22a, the 2×2 switch 23a, the 2×2 switch 24a, the 2×1 switch 22d, and the 2×2 switch 23d, the number of switches through which the signal has passed is "5". Assuming that the optical loss at each switch is 0.3 dB, the difference between the losses of the two routes is around 0.9 dB.

The VAT monitoring and controlling unit 62 controls the attenuation amounts for the variable attenuators 61a to 61d so that the difference between the losses is compensated. Thus, with this structure of the optical ADM apparatus, the optical levels of signals guided to individual inter-station lines become the same.

FIG. 17 is a schematic diagram showing the structure of an optical ADM apparatus according to a twelfth feature of the present invention. As with the eleventh feature, the optical ADM apparatus according to the twelfth feature has a function for causing optical levels of signals to be guided to the individual inter-station lines to be equalized. However, the structure that accomplishes the function according to the twelfth feature is different from that according to the eleventh feature.

In the optical ADM apparatus according to the twelfth feature, variable attenuators 61a to 61d and optical couplers 63a to 63d are disposed between first output ports of 2×2 switches 23a to 23d and multiplexers 503a to 503d, respectively. The optical couplers 63a to 63d function as optical splitters. The optical couplers 63a to 63d split signals that are output from the variable attenuators 61a to 61d and guides the signals to the multiplexers 503a to 503d and a VAT monitoring and controlling unit 64. At that point, the splitting ratio of each of the optical couplers 63a to 63d is n:1 (where n is sufficiently larger than 1). The optical level of a signal guided to the VAT monitoring and controlling unit 64 is sufficiently smaller than that of a signal that is output to an inter-station line.

The VAT monitoring and controlling unit 64 monitors the optical levels of individual signals received from the optical couplers 63a to 63d and controls the attenuation amounts for the variable attenuators 61a to 61d so that the light levels of the signals become the same. In other words, the optical levels of the signals to be transmitted to inter-station lines are controlled in a feedback system. Thus, the optical levels of signals to be transmitted to the inter-station lines become the same.

FIG. 18 is a schematic diagram showing the structure of an optical ADM apparatus according to a thirteenth feature of the present invention. The optical ADM apparatus according to the thirteenth feature has a function for equalizing multi-wavelength light for each inter-station line. This function is accomplished by the variable attenuators 61a to 61d, optical couplers 65a to 65d, and a VAT monitoring and controlling unit 66. The variable attenuators 61a to 61d are disposed between first output ports of 2×2 switches 23a to 23d and multiplexers 503a to 503d, respectively. The optical couplers 65a to 65d are disposed at outputs of the multiplexers 503a to 503d, respectively. The VAT monitoring and controlling unit 66 controls the attenuation amounts of the variable attenuators 61a to 61d. FIG. 18 shows only a switch circuit for a particular wavelength. However, the VAT monitoring and controlling unit 66 controls the variable attenuators 61a to 61d of all switch circuits 10-1 to 10-n.

The optical couplers 65a to 65d function as optical splitters. Multi-wavelength light that is output from the multiplexers 503a to 503d is guided to corresponding inter-station lines. A part of the multi-wavelength light is guided to the VAT monitoring and controlling unit 66. The splitting ratio of each of the optical couplers 65a to 65d is n:1 (where n is a value sufficiently larger than 1). The optical level of the multi-wavelength light guided to the VAT monitoring and controlling unit 64 is sufficiently smaller than that of multi-wavelength light that is output to inter-station lines.

The VAT monitoring and controlling unit 66 monitors wavelength characteristics of multi-wavelength light received from the optical couplers 65a to 65d. That is, the VAT monitoring and controlling unit 66 monitors the optical levels of the individual channels contained in the multi-wavelength light. The VAT monitoring and controlling unit 66 controls the attenuation amounts of the variable attenuators 61a to 61d of the switch circuits 10-1 to 10-n so that the multi-wavelength light is equalized for the individual inter-station lines. Thus, the multi-wavelength light that is guided to the individual inter-station lines is equalized.

Figure 19:
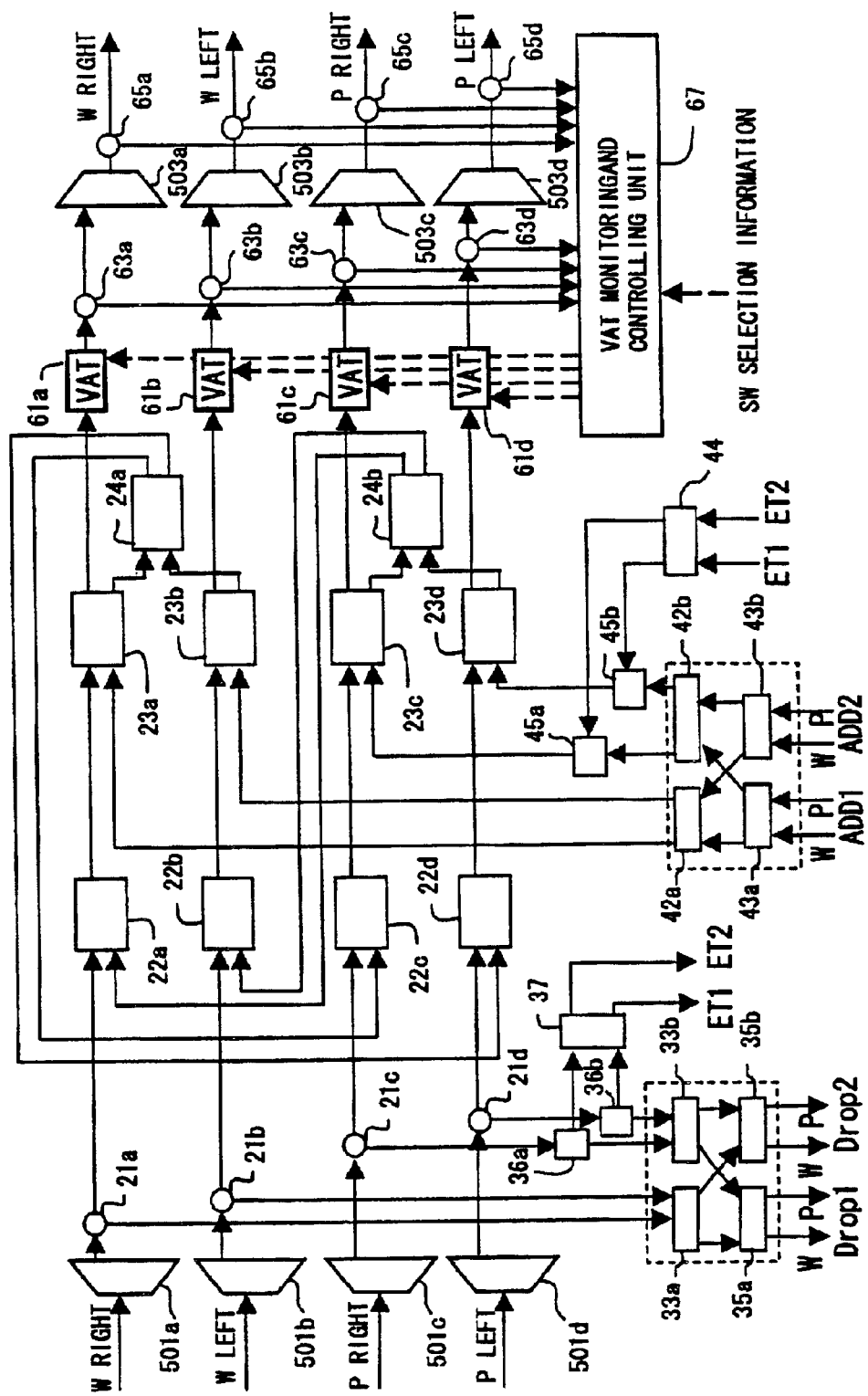

FIG. 19 is a schematic diagram showing the structure of an optical ADM apparatus according to a fourteenth feature of the present invention. The optical ADM apparatus according to the fourteenth feature is accomplished by combining the functions described in the eleventh to thirteenth features shown in FIGS. 16 to 18. The optical ADM apparatus shown in FIG. 19 has the three functions according to the eleventh to thirteenth features. Alternatively, the optical ADM apparatus according to the fourteenth feature may have any two of the three functions.

In the structures shown in FIGS. 16 to 19, the variable attenuators 61a to 61d for adjusting the optical levels of signals are disposed. Alternatively, optical amplifiers may be used instead of variable attenuators.

Next, a fault recovering function of the optical ADM apparatus according to the present invention will be described. In the following description, it is assumed that a fault takes place on a communication network of which a plurality of optical ADM apparatuses are connected in a ring shape.

First Embodiment

Figure 20B:
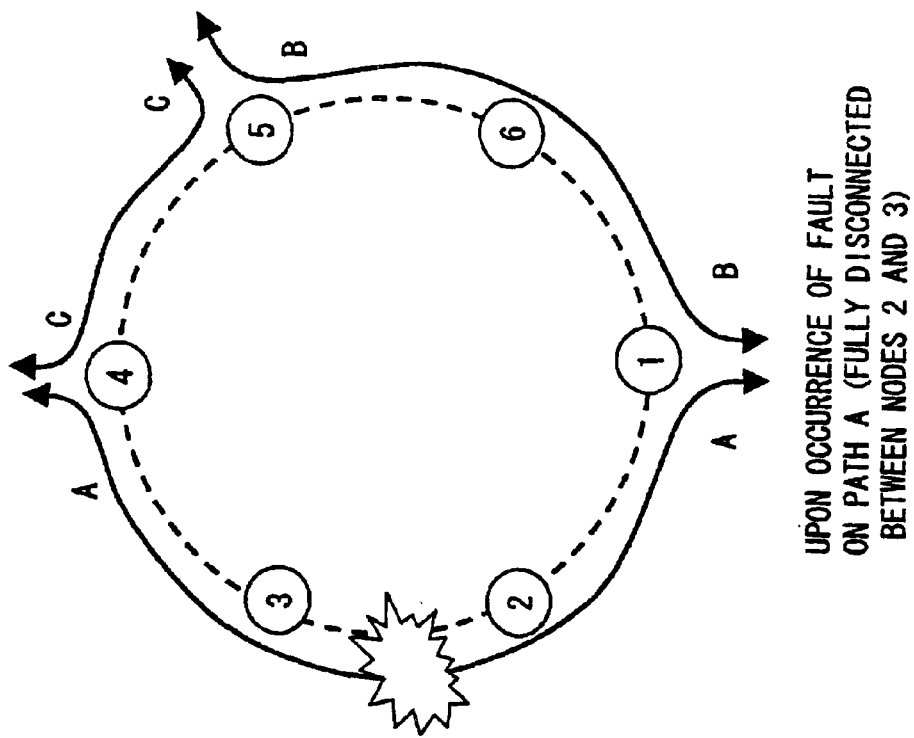
FIG. 20B is a schematic diagram showing the location of a fault that takes place.
Figure 20A:
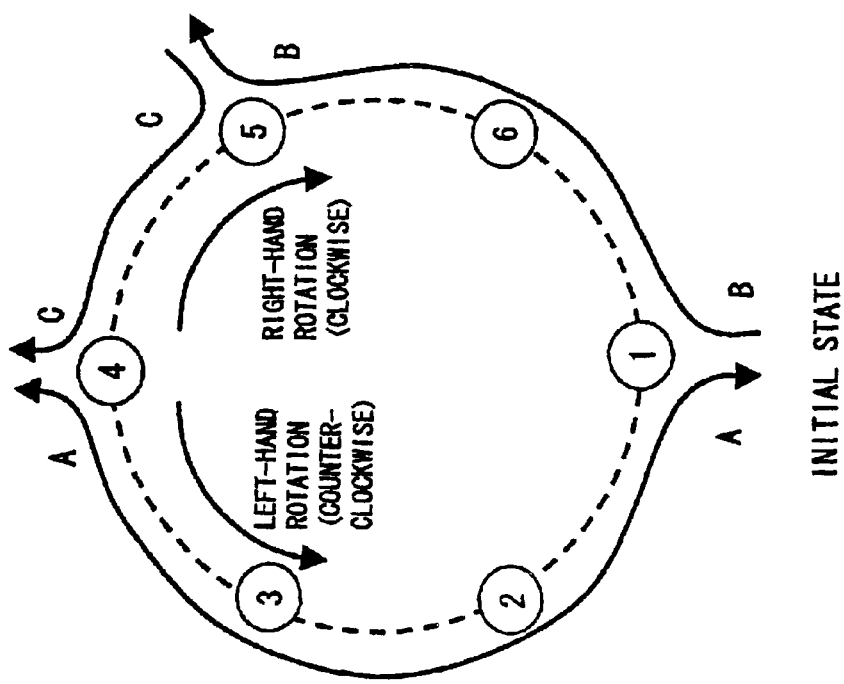
FIG. 20A is a schematic diagram showing an operation state of a network.

According to a first embodiment, as shown in FIG. 20A, a network is configured in such a manner that six optical ADM apparatuses (ADM #1 to ADM #6) are connected in a ring shape. As was described with reference to FIG. 4, each optical ADM apparatus is connected with four inter-station lines (W-right, W-left, P-right, and P-left). In addition, currently, using a particular wavelength λ1, channels A to C have been assigned. The channel A is a communication channel for bi-directionally transmitting a signal between the ADM #1 and the ADM #4 using two work lines (W-right and W-left). Likewise, the channel B is a communication channel for bi-directionally transmitting a signal between the ADM #1 and the ADM #5 using the two work lines. The channel C is a communication channel for bi-directionally transmitting a signal between the ADM #4 and the ADM #5 using the two work lines.

In such a situation, as shown in FIG. 20B, it is assumed that a fault takes place on a transmission line between the ADM #2 and the ADM #3. In this example, it is assumed that faults take place on all four optical fiber lines disposed between the ADM #2 and the ADM #3. In this case, an operation for recovering the channel A from a fault is performed.

Figure 21:
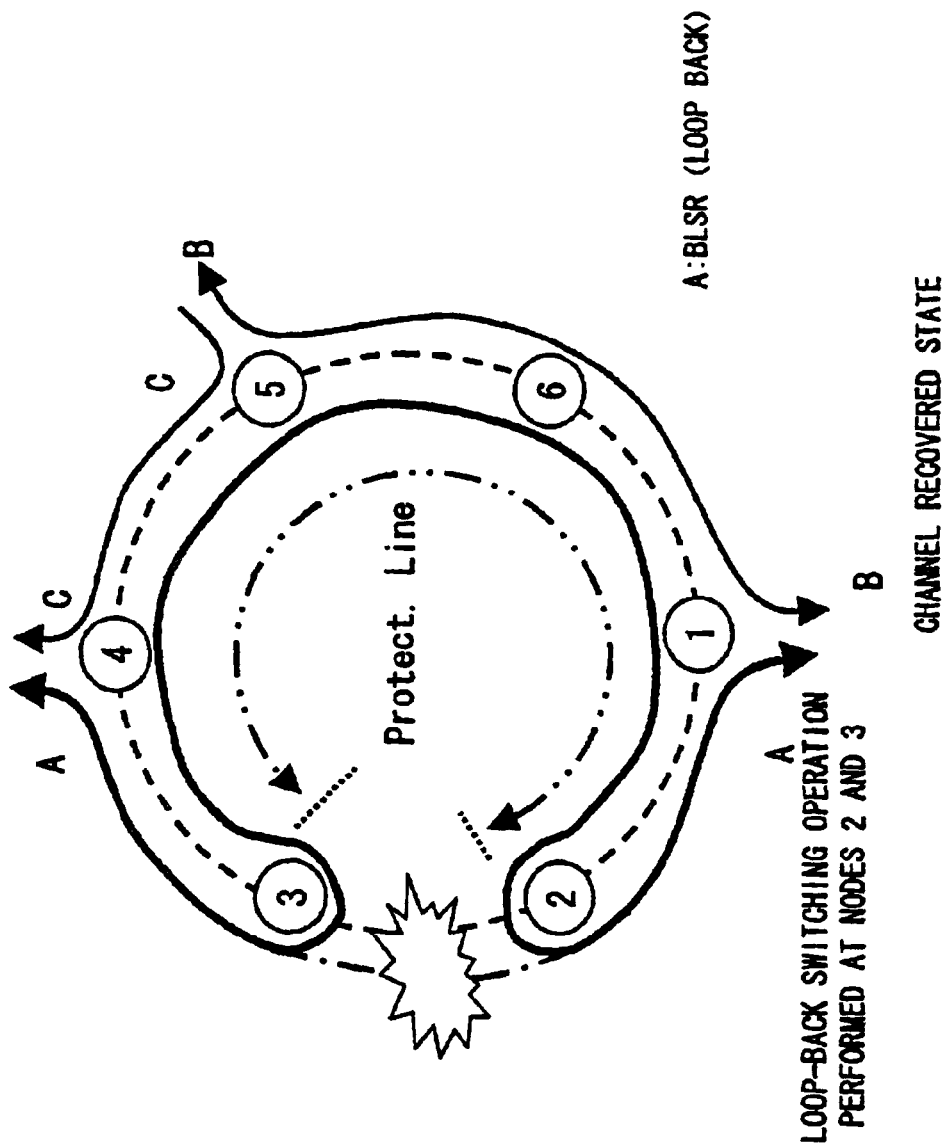
FIG. 21 is a schematic diagram for explaining a method for recovering the network from a fault according to the first embodiment.

FIG. 21 is a schematic diagram showing the state that the channel A is recovered from a fault by loop-back operation according to the BLSR (Bi-directional Line Switching Ring).

The loop-back operation shown in FIG. 21 is performed by an optical ADM apparatus that is connected to a transmission line on which a fault takes place in such a manner that a signal received from a work line is output to a protection line and a signal received from a protection line is output to a work line. According to the embodiment, such a switching operation is performed in the ADM #2 and the ADM #3. As a result, a signal that flows from the ADM #1 to the ADM #4 is transferred to the ADM #2 using the work line. Then, the signal is transmitted to the ADM #3 through the ADM #1, the ADM #6, the ADM #5, and the ADM #4 using the protection line. Thereafter, the signal is transmitted to the ADM #4 using the work line. On the other hand, a signal that flows from the ADM #4 to the ADM #1 is transmitted in the reverse direction on the route.

Figure 22:
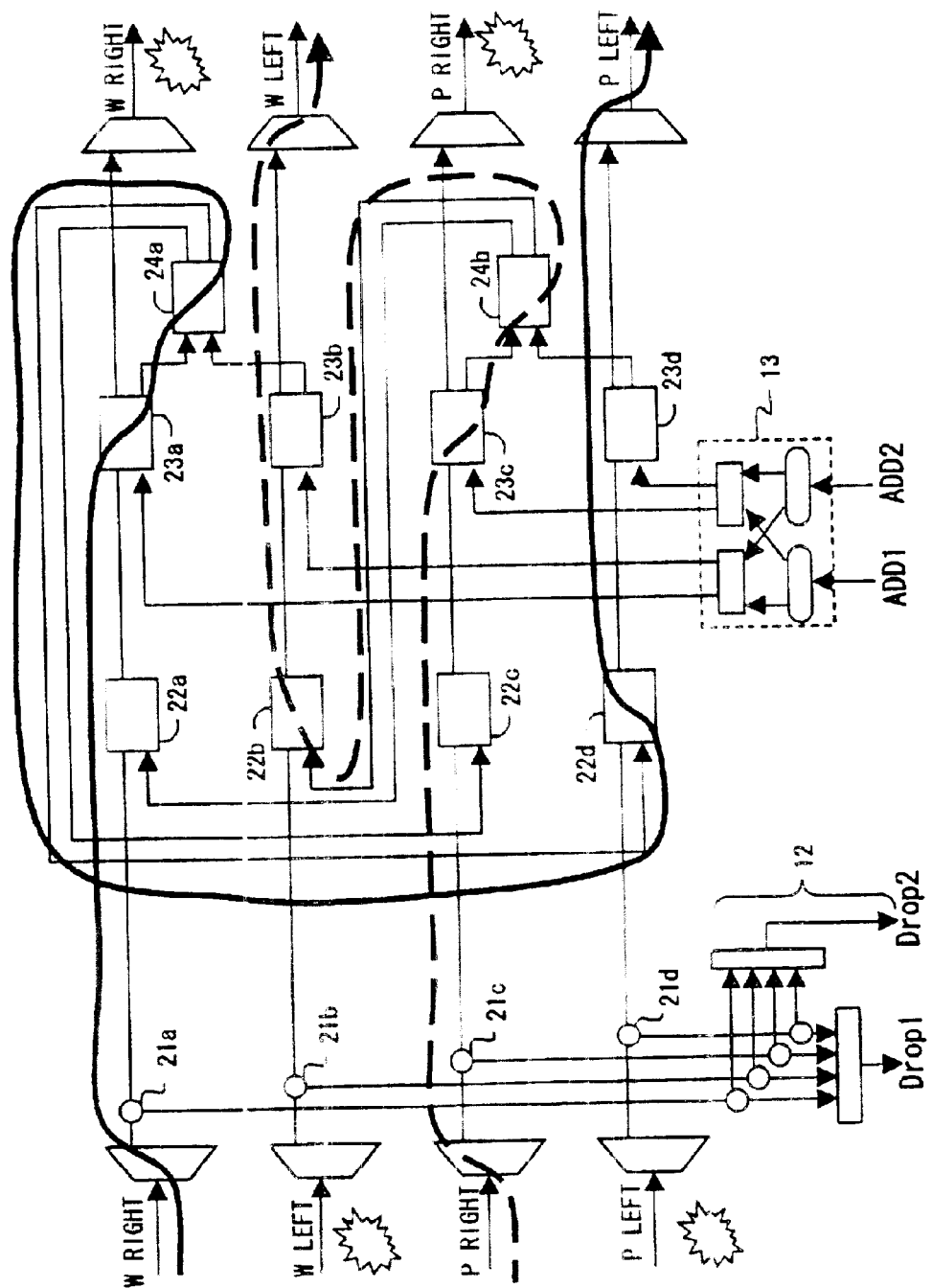
FIG. 22 is a schematic diagram showing an operation of an optical ADM apparatus in the case that a loop-back operation is performed.

FIG. 22 is a schematic diagram showing an operation of an optical ADM apparatus that performs the loop-back operation shown in FIG. 21. FIG. 22 shows a switching operation of the ADM #2 shown in FIG. 21.

When the network is in the state shown in FIG. 20A, the ADM #2 outputs a signal received through the inter-station line (W-right) to the inter-station line (W-right) and outputs a signal received through the inter-station line (W-left) to the inter-station line (W-left). As shown in FIG. 20B, when a fault takes place between the ADM #2 and the ADM #3, the ADM #2 cannot receive a signal transmitted from the ADM #3. In other words, the ADM #2 cannot receive a signal from the inter-station line (W-left). When the ADM #2 has determined that it cannot receive the signal from the inter-station line (W-left), the ADM #2 controls each switch as follows.

The 2×1 switch 22a is placed in the "bar state". The 2×2 switch 23a is placed in the "cross state". The 2×2 switch 24a is placed in the "cross state". The 2×1 switch 22d is placed in the "cross state". The 2×2 switch 23d is placed in the "bar state". Thus, when a signal that is transmitted from the ADM #1 is input to the ADM #2 through the inter-station line (W-right), as denoted by a solid line in FIG. 22, the signal is guided to the inter-station line (P-left) through the 2×1 switch 22a, the 2×2 switch 23a, the 2×2 switch 24a, the 2×1 switch 22d, and the 2×2 switch 23d.

The above-described switching operation is also performed by the ADM #3. However, the ADM #3 performs a switching operation in such a manner that a signal transmitted from the ADM #4 through the inter-station line (W-left) is looped back to the inter-station line (P-right). Thus, the ADM #2 receives the signal that is transmitted from the ADM #4 through the inter-station line (P-right). The ADM #2 controls each switch as follows.

The 2×1 switch 22c is placed in the "bar state". The 2×2 switch 23c is placed in the "cross state". The 2×2 switch 24b is placed in the "cross state". The 2×1 switch 22b is placed in the "cross state". The 2×2 switch 23b is placed in the "bar state". Thus, when a signal that is transmitted from the ADM #4 is input to the ADM #2 through the inter-station line (P right), as denoted by a broken line in FIG. 22, the signal transmitted is guided to the inter-station line (W-left) through the 2×1 switch 22c, the 2×2 switch 23c, the 2×2 switch 24b, the 2×1 switch 22b, and the 2×2 switch 23b.

The switching operation is also performed by the ADM #3. However, the ADM #3 performs a switching operation in such a manner that a signal that is transmitted through the inter-station line (P-left) is looped back to the inter-station line (W-right).

In such a manner, the optical ADM apparatus according to the embodiment can recover from a fault with the loop-back function of the BLSR.

Second Embodiment

Figure 23B:
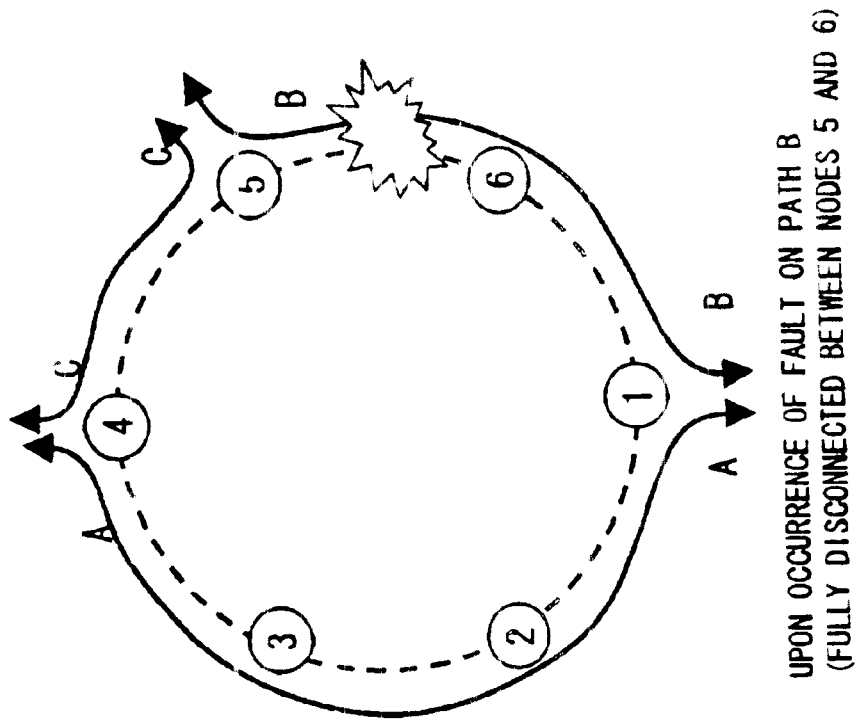
FIG. 23B is a schematic diagram showing the location of a fault that takes place.
Figure 23A:
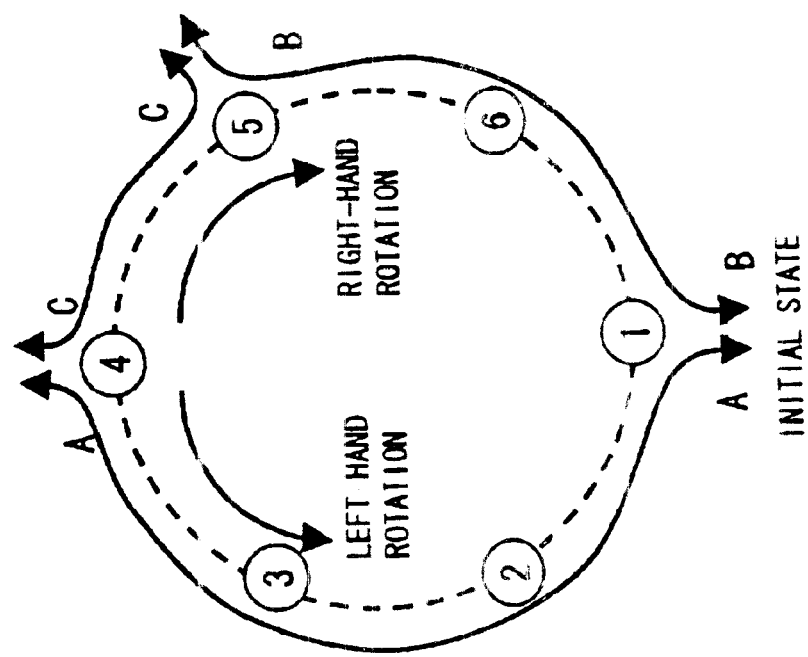
FIG. 23A is a schematic diagram showing an operation state of the network.

As shown in FIG. 23A, the network configuration and the operation state before occurrence of a fault according to the second embodiment are the same as those according to the first embodiment.

In such a state, it is assumed that as shown in FIG. 23B a fault takes place on a transmission line between the ADM #5 and the ADM #6. In this example, it is assumed that faults take place on all four optical fiber lines disposed between the ADM #5 and the ADM #6. In this case, an operation for recovering the channel B is performed.

Figure 24:
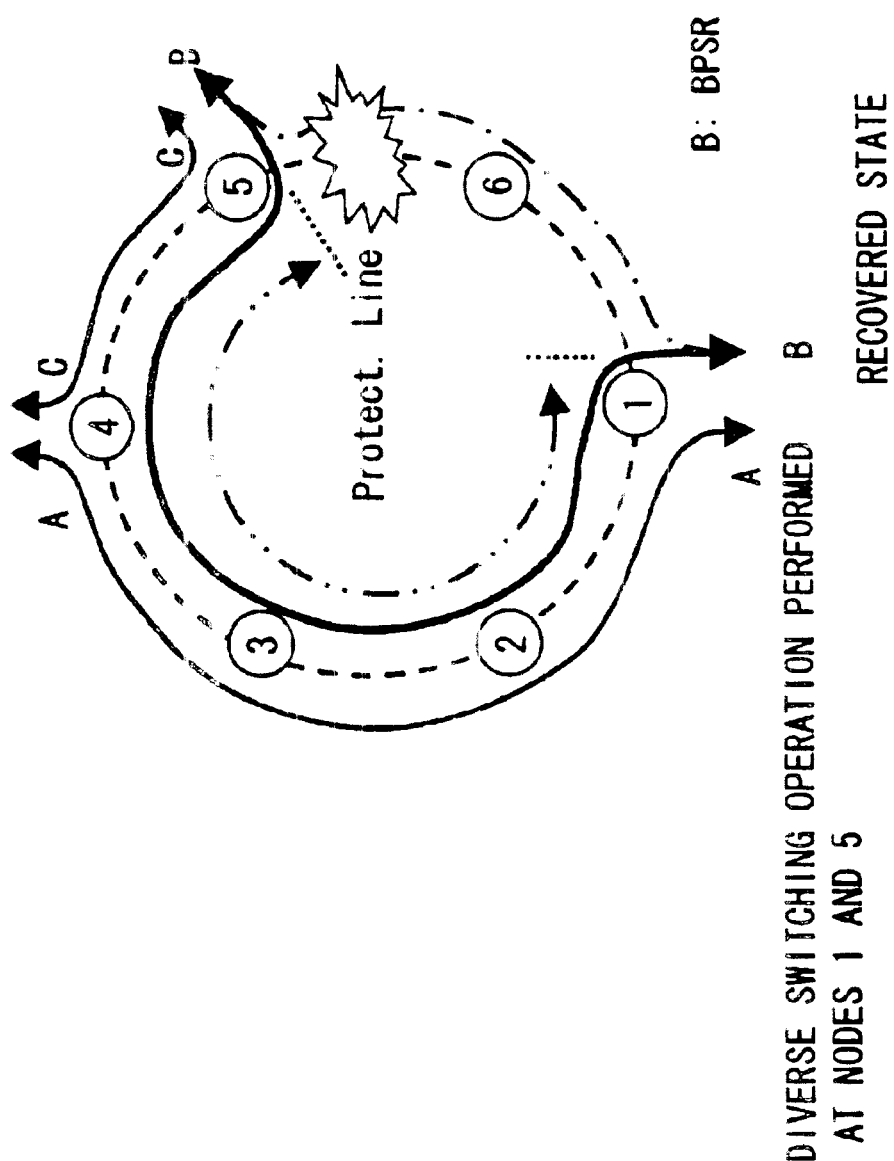
FIG. 24 is schematic diagram for explaining a method for recovering the network from a fault according to the second embodiment.

FIG. 24 is a schematic diagram showing the state that the channel B is recovered using a diverse switching operation of the BPSR (Bi-directional Path Switched Ring).

When one optical ADM apparatus adds a signal to a channel that is disconnected due to a fault and another optical ADM apparatus drops a signal from the channel, these optical ADM apparatuses perform a diverse switching operation so as to recover from a defect. That is, the optical ADM apparatus that adds a signal to the channel changes the switching state from a state where a signal is added to a work line in one direction to a state where the signal is added to a protection line in the other direction. On the other hand, the optical ADM apparatus that drops the signal from the channel changes the switching state from a state where the signal is dropped from the work line in one direction to a state where the signal is dropped from the protection line in the other direction.

According to the embodiment, the ADM #1 and the ADM #5 perform the above-described switching operations. As a result, a signal that flows from the ADM #1 to the ADM #5 is transmitted to the ADM #5 through the ADM #2, the ADM #3, and the ADM #4 using a protection line. On the other hand, a signal that flows from the ADM #5 to the ADM #1 is transmitted on the same route in the reverse direction.

Basically, a fault on a transmission line is detected by an optical ADM apparatus connected thereto. Thus, when an optical ADM apparatus that adds/drops a signal is not connected to the transmission line on which the fault takes place, the optical ADM apparatus that has detected the fault sends to an optical ADM apparatus that adds/drops the signal a message that represents that the fault takes place. The optical ADM apparatus that adds/drops the signal performs the diverse switching operation corresponding to the message. The message may be sent using an inter-station line on which a fault does not take place. Alternatively, the message may be sent using another medium.

Figure 25:
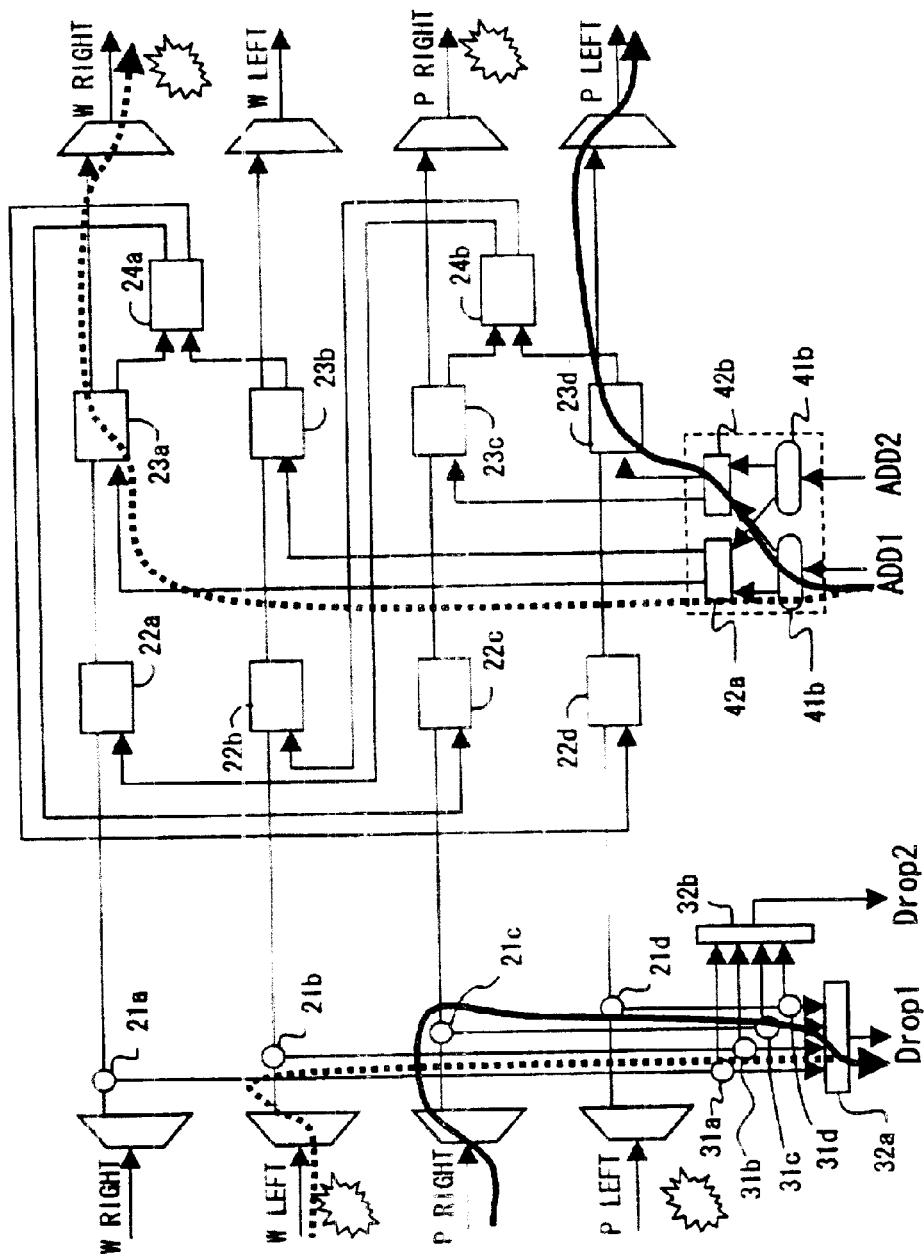
FIG. 25 is a schematic diagram showing an operation of an optical ADM apparatus in the case that a diverse switching operation is performed.

FIG. 25 is a schematic diagram showing an operation of an optical ADM apparatus that performs the diverse switching operation shown in FIG. 24. FIG. 25 shows the switching operation of the ADM #5.

Before a fault takes place, as denoted by a dotted line in FIG. 25, the ADM #5 guides a signal received from the intra-station line (Add-1) to the inter-station line (W-right). At that time, as shown in FIG. 24B, a fault takes place on a transmission line between the ADM #5 and the ADM #6. When the ADM #5 receives a message that represents that the fault takes place, the ADM #5 controls each switch as follows. In other words, the 2×2 switch 42b is placed in the "cross state". The 2×2 switch 23d is placed in the "cross state". Thus, a signal received from the intra-station line (Add-1) is guided to the inter-station line (P-left) through the 2×2 switch 42b and the 2×2 switch 23d as denoted by a solid line in FIG. 25.

The above-described switching operation is also performed by the ADM #1. However, in the ADM #1, a switching state is designated so that a signal received from a particular intra-station line is guided to the inter-station line (P-right) Thus, the ADM #5 receives a signal that has been added by the ADM #1 through the inter-station line (P-right). The ADM #5 is controlled so that the 4×1 switch 32a selects a signal guided through the optical coupler 31c. Thus, when the signal transmitted from the ADM #1 is input to the ADM #5 through the inter-station line (P-right), as denoted by a solid line in FIG. 25, the signal transmitted from the ADM #1 is guided to the intra-station line (Drop-1) through the optical coupler 21c, the optical coupler 31c, and the 4×1 switch 32a.

The switching operation is also performed by the ADM #1. However, the ADM #1 performs the switching operation in such a manner that a signal transmitted through the inter-station line (P-left) is guided to a corresponding intra-station line.

In such a manner, the optical ADM apparatus according to the embodiment can recover from a fault by the diverse switching operation of the BPSR.

Third Embodiment

The configuration of the network and the operation state before an occurrence of a fault according to the third embodiment are the same as those according to the first embodiment shown in FIG. 20A. As with the first embodiment, it is assumed that a fault takes place on a transmission line between the ADM #2 and the ADM #3. However, unlike with the first embodiment, in the third embodiment, faults take place only on the work lines (W-right and W-left) of the four optical fiber lines disposed between the ADM #2 and the ADM #3.

Figure 26:
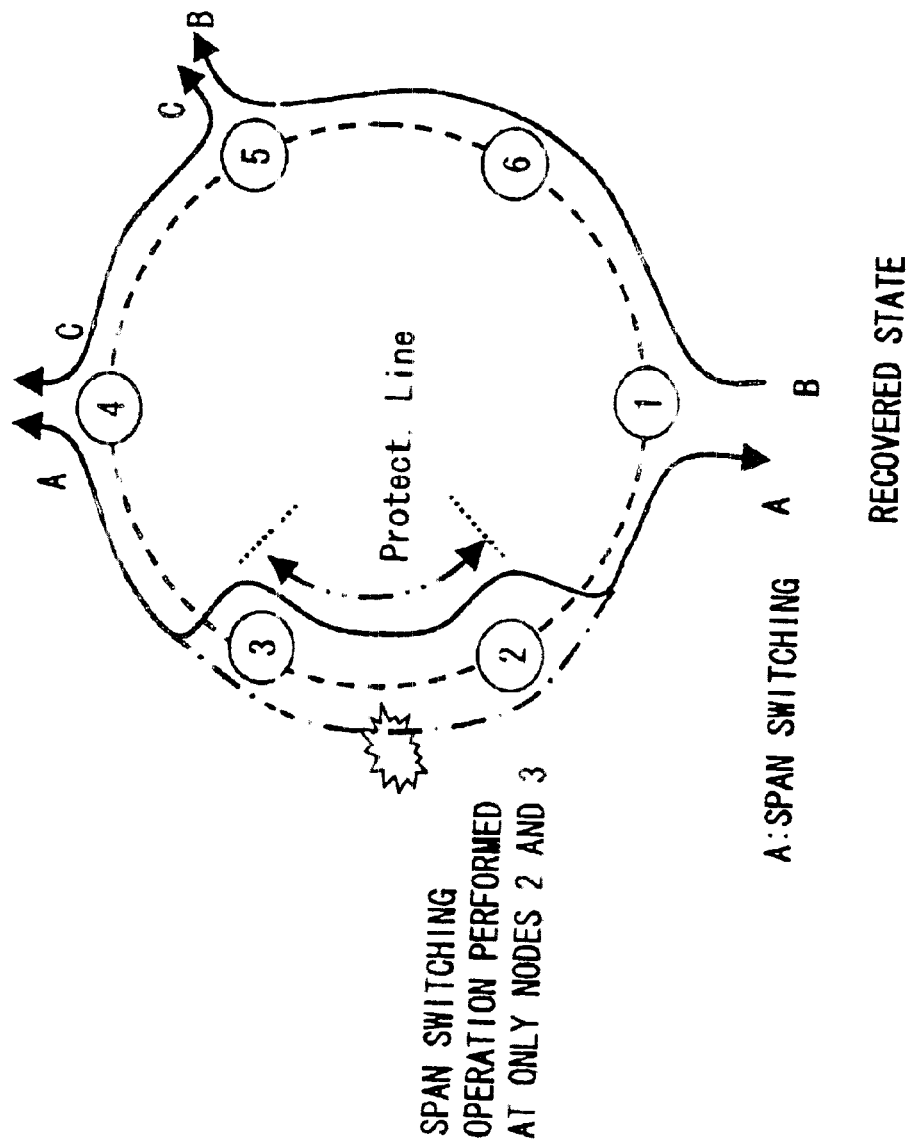
FIG. 26 is a schematic diagram for explaining a method for recovering the network from a fault according to the third embodiment.

FIG. 26 shows a state that the channel is recovered using the span switching operation of the BPSR (Bi-directional Path Switched Ring).

The recovery using the span switching operation is performed by transmitting a signal using a protection line in a transmission section where the work line is disconnected. That is, an optical ADM apparatus connected to a transmission line on which a fault takes place transmits a signal to a protection line of transmission lines and receives a signal from a protection line thereof.

According to the embodiment, the ADM #2 and the ADM #3 perform the above-described operation. As a result, a signal that flows from the ADM #2 to the ADM #3 and a signal that flows from the ADM #3 to the ADM #2 are transmitted using the protection lines.

Figure 27:
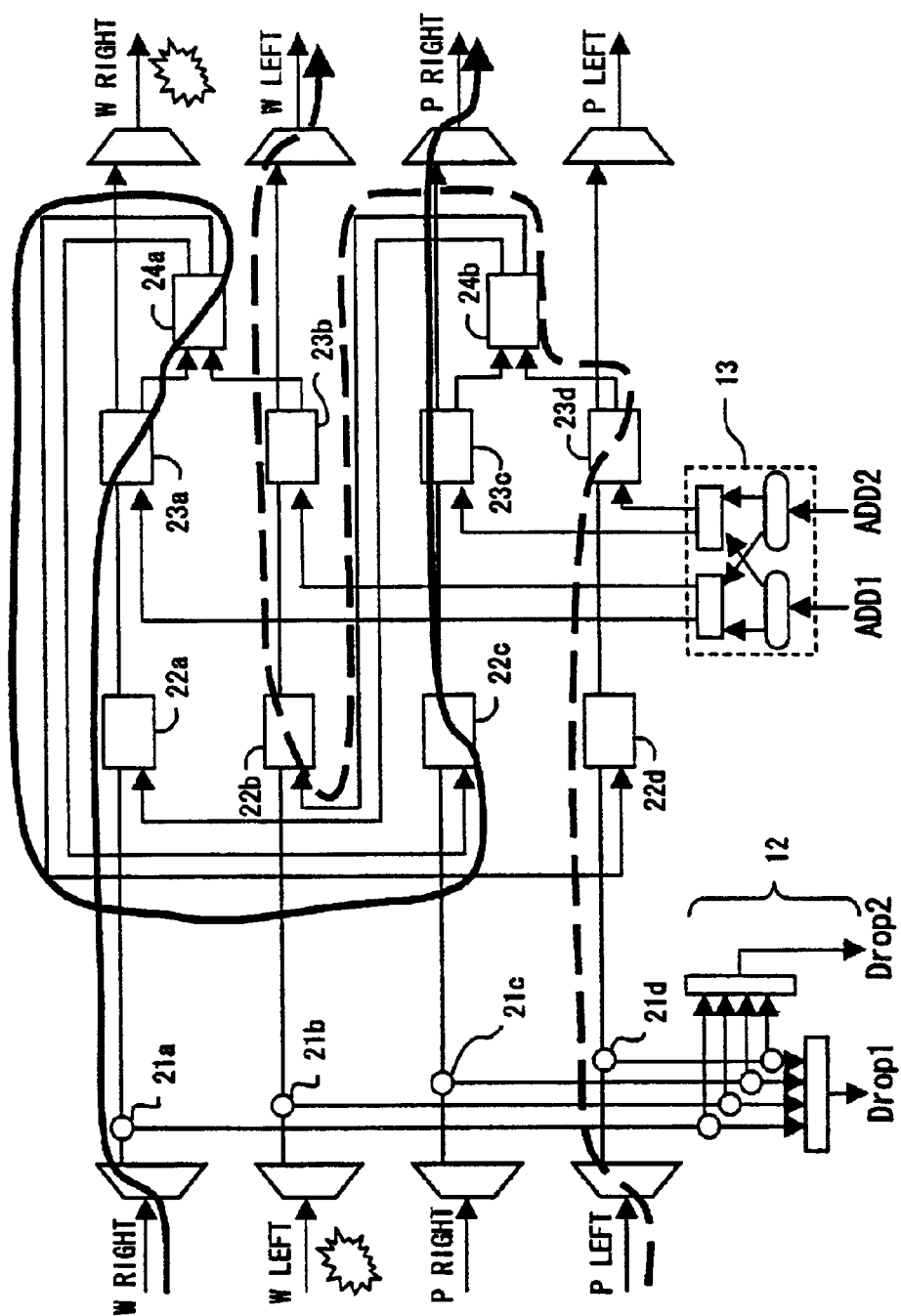
FIG. 27 is a schematic diagram showing an operation of an optical ADM apparatus in the case that a span switching operation is performed.

FIG. 27 is a schematic diagram showing an operation of an optical ADM apparatus that performs the recovering operation shown in FIG. 26. Here, a switching operation that the ADM #2 shown in FIG. 26 performs.

When the network is in the state shown in FIG. 20A, the ADM #2 outputs a signal received through the inter-station line (W-right) to the inter-station line (W-right) and outputs a signal received through the inter-station line (W-left) to the inter-station line (W-left). At this time, as shown in FIG. 20B, if faults take place on the work lines (W-right and W-left) between the ADM #2 and the ADM #3, the ADM #2 cannot receive a signal transmitted from the ADM #3. In other words, the ADM #2 cannot receive a signal through the inter-station line (W-left). In this case, when the ADM #2 detects this situation and determines that the protection lines are normal, the ADM #2 controls each switch as follows.

The 2×1 switch 22a is placed in the "bar state". The 2×2 switch 23a is placed in the "cross state". The 2×2 switch 24a is placed in the "bar state". The 2×1 switch 22c is placed in the "cross state". The 2×2 switch 23c is placed in the "bar state". As a result, when the signal transmitted from the ADM #1 is input to the ADM #2 through the inter-station line (W-right), as denoted by a solid line in FIG. 27, the signal is guided to the inter-station line (P-right) through the 2×1 switch 22a, the 2×2 switch 23a, the 2×2 switch 24a, the 2×1 switch 22c, and the 2×2 switch 23c.

The above-described switching operation is also performed by the ADM #3. However, the ADM #3 performs the switching operation in such a manner that a signal transmitted from the ADM #4 through the inter-station line (W-left) is guided to the inter-station line (P-left). Thus, the ADM #2 receives the signal transmitted from the ADM #4 through the inter-station line (P-left). The ADM #2 controls each switch as follows.

The 2×1 switch 22d is placed in the "bar state". The 2×2 switch 23d is placed in the "cross state". The 2×2 switch 24b is placed in the "bar state". The 2×1 switch 22b is placed in the "cross state". The 2×2 switch 23b is placed in the "bar state". Thus, when the signal that is transmitted from the ADM #4 is input to the ADM #2 through the inter-station line (P-left), as denoted by a dotted line in FIG. 27, the signal is guided to the inter-station line (W-left) through the 2×1 switch 22d, the 2×2 switch 23d, the 2×2 switch 24b, the 2×1 switch 22b, and the 2×2 switch 23b.

Likewise, the switching operation is also performed by the ADM #3. However, the ADM #3 performs the switching operation in such a manner that a signal transmitted through the inter-station line (P-right) is guided to the inter-station line (W-right).

In such a manner, the optical ADM apparatus according to the embodiment can recover from a fault by the span switching operation of the BPSR.

According to the present invention, since a switch circuit is composed in a combination of small optical devices, an optical ADM apparatus with high reliability can be accomplished. Even if a part of optical devices that compose a switch circuit must be replaced, since the other optical devices can be still operated, change or stop of communication services can be minimized.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An optical add/drop multiplexing apparatus, to which first to fourth input lines, first to fourth output lines, an add line, and a drop line are connected, said apparatus comprising:

four first optical devices for splitting signals that are input from the first to fourth input lines, respectively;

four first switches disposed corresponding to the first to fourth output lines, respectively;

four second switches disposed corresponding to the first to fourth output lines, respectively;

a pair of third switches;

a drop unit for guiding a signal split by said first optical devices to the drop line; and an add unit for guiding a signal received from the add line to said second switches, wherein one of said pair of third switches guides a signal received from a second switch assigned for the first and second output lines to a first switch assigned for the third and fourth output lines, wherein the rest of said pair of third switch guides a signal received from a second switch assigned for the third and fourth output lines to a first switch assigned for the first and second output lines, wherein said four first switches output signals split by said corresponding first optical devices or signals received from said third switches, and wherein the four second switches output signals received from said corresponding four first switches or signals received from the add unit to the corresponding output lines.

2. The optical add/drop multiplexing apparatus according to claim 1, wherein said first switches are 2×1 switches, said second switches are 2×2 switches, and said third switches are 2×2 switches.

3. The optical add/drop multiplexing apparatus according to claim 1, wherein the drop line contains first and second drop lines, wherein the drop unit comprises:

four second optical devices for splitting signals split by said four first optical devices;

a switch for guiding one of the signals split by said four second optical devices to the first drop line; and a switch for guiding one of the signals split by said four second optical devices to the second drop line.

4. The optical add/drop multiplexing apparatus according to claim 1, wherein the drop line contains first and second drop lines, wherein the drop unit comprises:

two 2×2 switches for exchanging the signals split by said first optical devices; and two 2×1 switches for guiding the signals exchanged by said two 2×2 switches to the first and second drop lines.

5. The optical add/drop multiplexing apparatus according to claim 1, wherein the drop line contains first to fourth drop lines, and wherein the drop unit comprises:

two 2×2 switches for exchanging the signals split by said first optical devices; and two 2×2 switches for guiding the signals exchanged by said two 2×2 switches to the first to fourth drop lines.

6. The optical add/drop multiplexing apparatus according to claim 1, wherein the add line contains first and second add lines, and wherein the add unit comprises:

two third optical devices for splitting signals received from the first and second add lines; and two switches for guiding the signals split by said third optical devices to said second switches.

7. The optical add/drop multiplexing apparatus according to claim 1,
wherein the add line contains first to fourth add lines, and
wherein the add unit comprises:
two first 2×2 switches for exchanging signals received from the first to fourth add lines; and
two second 2×2 switches for guiding the signals exchanged by said two first 2×2 switches to said second switches.

8. The optical add/drop multiplexing apparatus according to claim 1,
wherein said add unit has a switch for guiding a low priority signal to second switches assigned for the third and fourth output lines, the priority of the low priority signal being lower than the priority of a signal received from the add line, and
wherein said drop unit has a switch for guiding a signal received from said first optical devices assigned for the third and fourth input lines to a line different from the drop line.

9. The optical add/drop multiplexing apparatus according to claim 1,
wherein the add unit has a switch for guiding a low priority signal to second switches assigned for the third and fourth output lines, the priority of the low priority signal being lower than the priority of a signal received from the add line, and
wherein the drop unit has an optical device for splitting a signal received from first optical devices assigned for the third and fourth input lines and guiding the split signal to a line different from the drop line.

10. The optical add/drop multiplexing apparatus according to claim 1, further comprising:
four first optical circulators for guiding signals received from the first to fourth input lines to corresponding transmission lines and guiding signals received from the transmission lines to the first to fourth output lines, respectively; and
four second optical circulators for guiding signals received from the transmission lines to the corresponding first optical devices and guiding signals that are output from said second switches to the corresponding transmission lines.

11. The optical add/drop multiplexing apparatus according to claim 1, further comprising:
adjusting means, disposed between said second switches and the corresponding output lines, for adjusting the levels of signals to be output to the output lines; and
a controller controlling said adjusting means corresponding to the states of the first to third switches.

12. The optical add/drop multiplexing apparatus according to claim 1, further comprising:
adjusting means, disposed between said second switches and the corresponding output lines, for adjusting the levels of signals to be output to the output lines; and
a controller detecting the levels of signals to be output to the output lines and controlling the adjusting means corresponding to the detected results.

13. The optical add/drop multiplexing apparatus according to claim 1,
wherein the first to fourth input lines and the first to fourth output lines each transmit multi-wavelength light,
wherein said first optical devices, said first switches, said second switches, said third switches, said drop unit, and said add unit are disposed corresponding to individual wavelengths, and
wherein said apparatus further comprises:
four demultiplexers for demultiplexing the multi-wavelength light received from the first to fourth input lines into signals with individual wavelengths and guiding the demultiplexed signals to the corresponding first optical devices; and
four multiplexers for multiplexing signals that are output from the second switches provided corresponding to individual wavelengths and outputting the multiplexed light to the first to fourth output lines.

14. The optical add/drop multiplexing apparatus according to claim 13, further comprising:
adjusting means, disposed between the second switches provided corresponding to individual wavelengths and the corresponding multiplexers, for adjusting the levels of signals; and
a controller controlling said adjusting means so that the multi-wavelength light that is output from the multiplexers is equalized.

15. An optical transmission system having a plurality of optical add/drop multiplexing apparatuses connected with a clockwise work line, a counterclockwise work line, a clockwise protection line, and a counterclockwise protection line in a ring shape, each of the optical add/drop multiplexing apparatuses being an apparatus according to claim 1.

* * * * *